(12) United States Patent
Mizusaki et al.

(10) Patent No.: US 10,802,344 B2
(45) Date of Patent: Oct. 13, 2020

(54) LIQUID CRYSTAL DISPLAY DEVICE AND METHOD FOR MANUFACTURING LIQUID CRYSTAL DISPLAY DEVICE

(71) Applicant: SHARP KABUSHIKI KAISHA, Sakai, Osaka (JP)

(72) Inventors: Masanobu Mizusaki, Sakai (JP); Kiyoshi Minoura, Sakai (JP); Akira Sakai, Sakai (JP)

(73) Assignee: SHARP KABUSHIKI KAISHA, Sakai, Osaka (JP)

( * ) Notice: Subject to any disclaimer, the term of this patent is extended or adjusted under 35 U.S.C. 154(b) by 0 days.

(21) Appl. No.: 16/334,914

(22) PCT Filed: Sep. 20, 2017

(86) PCT No.: PCT/JP2017/033863
§ 371 (c)(1),
(2) Date: Mar. 20, 2019

(87) PCT Pub. No.: WO2018/061918
PCT Pub. Date: Apr. 5, 2018

(65) Prior Publication Data
US 2019/0285925 A1     Sep. 19, 2019

(30) Foreign Application Priority Data
Sep. 29, 2016 (JP) ................... 2016-190892

(51) Int. Cl.
*G02F 1/13363* (2006.01)
*G02F 1/1337* (2006.01)
(Continued)

(52) U.S. Cl.
CPC .......... *G02F 1/13363* (2013.01); *G02F 1/137* (2013.01); *G02F 1/1337* (2013.01);
(Continued)

(58) Field of Classification Search
CPC ......... G02F 1/133788; G02F 1/133753; G02F 1/133723; G02F 1/133711; G02F 1/1337;
(Continued)

(56) References Cited

U.S. PATENT DOCUMENTS

2011/0199565 A1* 8/2011 Kunimatsu ....... G02F 1/133723
349/123
2012/0212691 A1 8/2012 Miyakawa et al.
(Continued)

FOREIGN PATENT DOCUMENTS

JP     2012-173600 A     9/2012

*Primary Examiner* — Michael H Caley
*Assistant Examiner* — Mariam Qureshi
(74) *Attorney, Agent, or Firm* — ScienBiziP, P.C.

(57) ABSTRACT

Provided is a liquid crystal display device including a first substrate; a second substrate; a liquid crystal layer sandwiched between the first substrate and the second substrate and containing a negative liquid crystal material; a first alignment film provided on the surface of the first substrate on the liquid crystal layer side; a first phase difference layer having birefringence provided between the first substrate and the first alignment film; and a second alignment film disposed on the surface of the second substrate on the liquid crystal layer side, wherein at least one of the first alignment film and the second alignment film is a photo-alignment film being in contact with the liquid crystal layer and imparting a pretilt angle of 75° or more and less than 90° to the liquid crystal material; the first phase difference layer is formed of a first polymer material having a first photofunctional group; the photo-alignment film is formed of a second polymer material having a second photofunctional group; and the first photofunctional group and the second photofunctional group are each a group causing at least one reaction selected from the group consisting of isomerization reaction, dimerization reaction, Fries rearrangement reaction, and cleavage reaction.

14 Claims, 4 Drawing Sheets

(51) Int. Cl.
*G02F 1/137* (2006.01)
*G02F 1/1335* (2006.01)

(52) U.S. Cl.
CPC .. *G02F 1/133711* (2013.01); *G02F 1/133723* (2013.01); *G02F 1/133753* (2013.01); *G02F 2001/13712* (2013.01); *G02F 2001/133565* (2013.01); *G02F 2001/133742* (2013.01); *G02F 2001/133749* (2013.01); *G02F 2001/133757* (2013.01); *G02F 2202/022* (2013.01); *G02F 2413/02* (2013.01); *Y10T 428/1023* (2015.01); *Y10T 428/1041* (2015.01)

(58) Field of Classification Search
CPC ..... G02F 1/13363; G02F 2001/133757; G02F 2001/133761; Y10T 428/1023; Y10T 428/1041
See application file for complete search history.

(56) References Cited

U.S. PATENT DOCUMENTS

2012/0314168 A1* 12/2012 Kang ................ G02F 1/133723
349/124
2013/0265532 A1* 10/2013 Kim .................. G02F 1/133753
349/124
2017/0357112 A1* 12/2017 Shibahara ............. G02F 1/1347

* cited by examiner

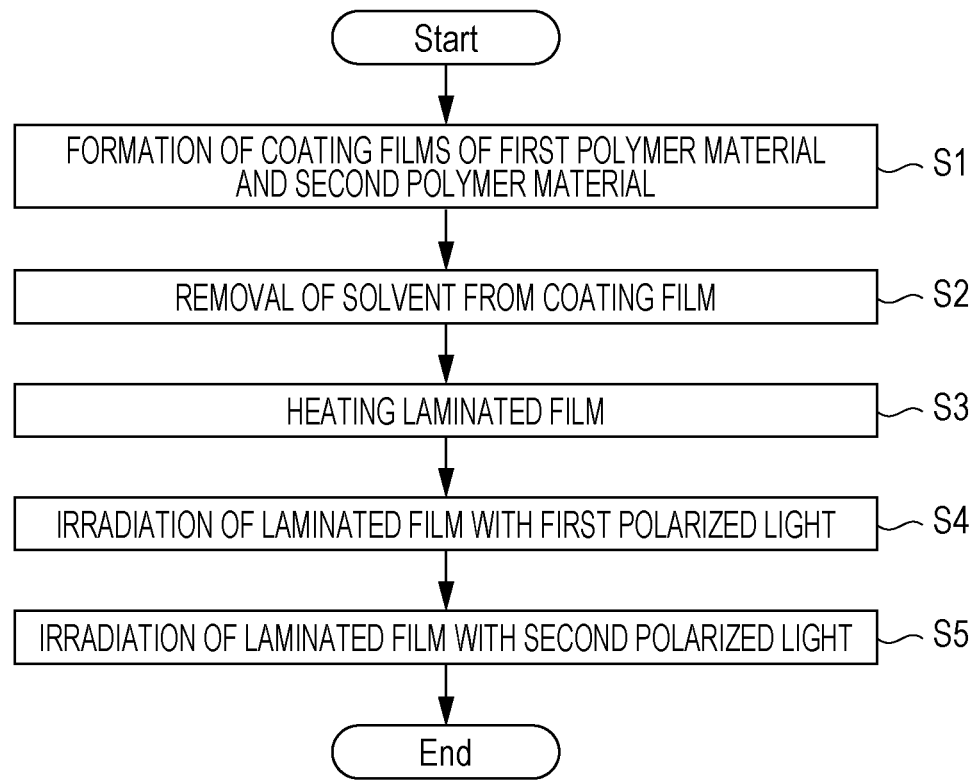
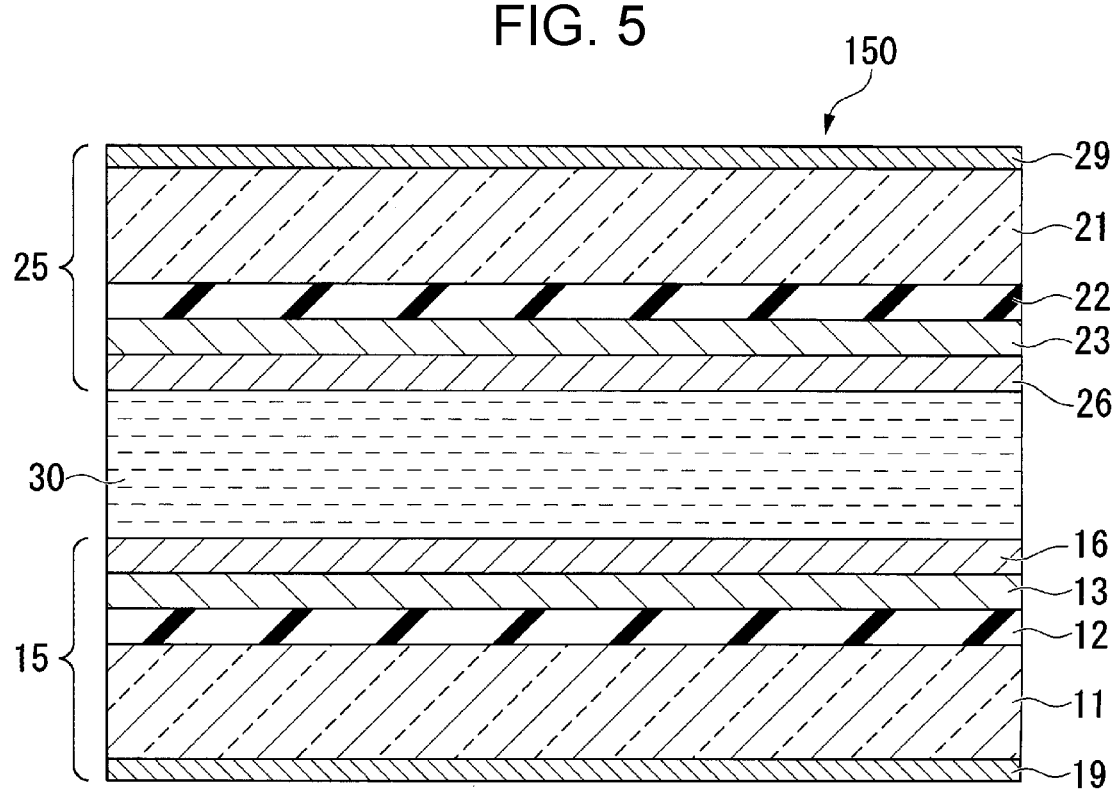

LIQUID CRYSTAL DISPLAY DEVICE AND METHOD FOR MANUFACTURING LIQUID CRYSTAL DISPLAY DEVICE

TECHNICAL FIELD

The present invention relates to a liquid crystal display device and a method for manufacturing a liquid crystal display device.

This application claims priority to Japanese Patent Application No. 2016-190892 filed on Sep. 29, 2016, and the entire contents of which are incorporated by reference herein.

BACKGROUND ART

Liquid crystal display devices have been widely used as displays for portable electronic devices, such as mobile phones, and for televisions and personal computers.

An electrically controlled birefringence (ECB) system is known as one alignment mode of liquid crystal display devices (for example, see PTL 1). In the liquid crystal display device of a vertical alignment ECB system, the liquid crystal molecules (liquid crystal material) are aligned perpendicular to the substrate in a voltage non-applied state, and the tilt angle of the liquid crystal material is changed by applying a voltage, and transmission and non-transmission of polarized light is controlled by using the birefringence of the liquid crystal material.

CITATION LIST

Patent Literature

PTL 1: Japanese Unexamined Patent Application Publication No. 2012-173600

SUMMARY OF INVENTION

Technical Problem

In the liquid crystal display devices such as those described in PTL 1, the angle (pretilt angle) of the liquid crystal material with respect to the substrate in a voltage non-applied state may be controlled for improving the viewing angle or enhancing the definition. However, a change in the pretilt angle of a liquid crystal material causes a change in the magnitude of retardation occurring in polarized light passing through the liquid crystal layer, leading to light leakage at the time of black display. As a result, a problem that the black display becomes bright to decrease the contrast, which is the ratio of the brightness at the time of black display to the brightness at the time of white display, tends to occur.

In order to solve such a problem, it is conceived to provide an optical compensation film (phase difference film) for controlling the retardation in the liquid crystal display device. However, in the manufacturing of a liquid crystal display device (liquid crystal panel) including an optical compensation film, the pasting step increases the number of steps, resulting in a reduction in productivity.

In addition, when an optical compensation film having a retardation value for compensation per unit thickness is used, since the change in the retardation caused by a change in the pretilt angle of the liquid crystal material is small, the necessary thickness of the optical compensation film is small, resulting in a difficulty in handling.

Furthermore, when an optical compensation film having a retardation value for compensation per unit thickness is used, it is possible to appropriately compensate the retardation itself caused by a change in the pretilt angle of the liquid crystal material. However, since the necessary thickness of the optical compensation film is large, the light transmittance as the entire liquid crystal display device is decreased.

An aspect of the present invention has been made in view of such circumstances, and it is an object to provide a liquid crystal display device that can easily suppress a decrease in contrast even if the pretilt angle is controlled.

It is also an object to provide a method for manufacturing a liquid crystal display device that can easily manufacture such a liquid crystal display device.

Solution to Problem

In order to solve the above-mentioned problems, an embodiment of the present invention provides a liquid crystal display device including a first substrate, a second substrate facing the first substrate, a liquid crystal layer sandwiched between the first substrate and the second substrate and containing a negative liquid crystal material, a first alignment film provided on the surface of the first substrate on the liquid crystal layer side, a first phase difference layer having birefringence provided between the first substrate and the first alignment film, and a second alignment film provided on the surface of the second substrate on the liquid crystal layer side, wherein at least one of the first alignment film and the second alignment film is a photo-alignment film being in contact with the liquid crystal layer and imparting a pretilt angle of 75° or more and less than 90° to the liquid crystal material; the first phase difference layer is formed of a first polymer material having a first photofunctional group; the photo-alignment film is formed of a second polymer material having a second photofunctional group; and the first photofunctional group and the second photofunctional group are each a group causing at least one photoreaction selected from the group consisting of isomerization reaction, dimerization reaction, Fries rearrangement reaction, and cleavage reaction.

In an embodiment of the present invention, the configuration may be that one of the first alignment film and the second alignment film is the photo-alignment film and the other of the first alignment film and the second alignment film is a vertical alignment film.

In an embodiment of the present invention, the configuration may be that the first alignment film and the second alignment film are the photo-alignment films and the alignment direction of the liquid crystal material by the first alignment film and the alignment direction of the liquid crystal material by the second alignment film are set in the same direction in the field of view from the normal direction of the first substrate.

In an embodiment of the present invention, the configuration may be that a second phase difference layer having birefringence provided between the second substrate and the second alignment film is formed of the first polymer material.

In an embodiment of the present invention, the configuration may be that the pretilt angle is 80.0° or more and 88.5° or less.

In an embodiment of the present invention, the configuration may be that the first photofunctional group is at least one group selected from the group consisting of a cinnamate group, an azobenzene group, a chalcone group, a tolane group, and a cyclobutane group.

In an embodiment of the present invention, the configuration may be that the second photofunctional group is at least one group selected from the group consisting of a coumarin group, a cinnamate group, and a stilbene group.

In an embodiment of the present invention, the configuration may further include an alignment sustaining layer being in contact with the surfaces of the first alignment film and the second alignment film.

In an embodiment of the present invention, the configuration may be that in adjacent four pixels, the liquid crystal alignment direction of a first pixel, the liquid crystal alignment direction of a second pixel, the liquid crystal alignment direction of a third pixel, and the liquid crystal alignment direction of a fourth pixel are different from each other, and the liquid crystal alignment direction of an arbitrary pixel of the adjacent four pixels and the liquid crystal alignment directions of the remaining three pixels are different by integral multiples of 90°.

In an embodiment of the present invention, the configuration may be that the first alignment film and the second alignment film are both the photo-alignment films.

In an embodiment of the present invention, the configuration may be that the first alignment film is a vertical alignment film and the second alignment film is the photo-alignment film.

In an embodiment of the present invention, the configuration may further include an underlayer provided between the second substrate and the second alignment film.

In an embodiment of the present invention, the configuration may further include a second phase difference layer having birefringence provided between the second substrate and the second alignment film.

In addition, an embodiment of the present invention provides a method for manufacturing a liquid crystal display device, the method including a step of applying a mixture solution containing a first polymer material having a first photofunctional group and a second polymer material having a second photofunctional group in a side chain onto a substrate and then removing the solvent to form a laminated film consisting of a first coating film formed of the first polymer material and a second coating film formed of the second polymer material; a step of heating the laminated film; a step of irradiating the heated laminated film with first polarized light having a wavelength causing photoreaction in the first photofunctional group; and a step of irradiating the heated laminated film with second polarized light having a wavelength causing photoreaction in the second photofunctional group, wherein the first photofunctional group does not cause the photoreaction with the second polarized light; and the second photofunctional group does not cause the photoreaction with the first polarized light.

Advantageous Effects of Invention

According to an aspect of the present invention, it is possible to provide a liquid crystal display device that can easily suppress a decrease in contrast even if the pretilt angle is controlled. It is also possible to provide a method for manufacturing such a liquid crystal display device that can easily manufacture the liquid crystal display device.

BRIEF DESCRIPTION OF DRAWINGS

FIG. 4 is a flow chart showing a method for manufacturing a liquid crystal display device according to a Second Embodiment.

FIG. 5 is a cross-sectional view schematically illustrating a liquid crystal display device according to a Third Embodiment.

DESCRIPTION OF EMBODIMENTS

First Embodiment

A liquid crystal display device according to a First Embodiment of the present invention will now be described with reference to the drawings. In all the following drawings, dimensions, ratios, etc. of each component are appropriately changed in order to make the drawings easy to see.

Figure 1:
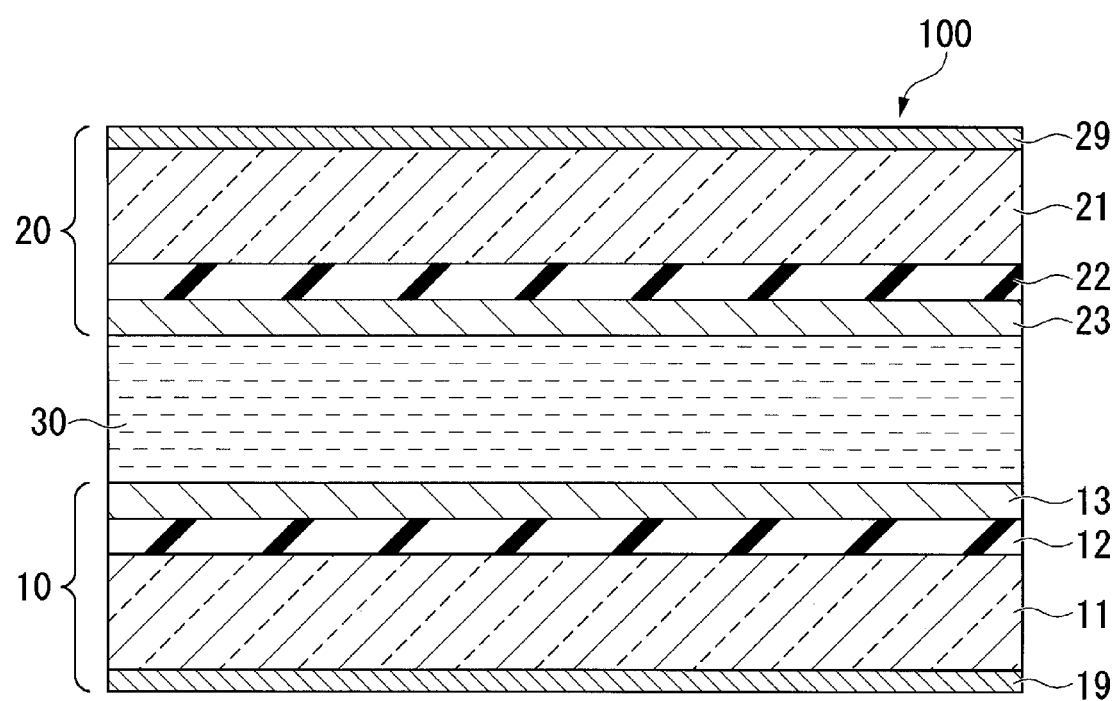
FIG. 1 is a cross-sectional view schematically illustrating a liquid crystal display device of a First Embodiment.

FIG. 1 is a cross-sectional view schematically illustrating the liquid crystal display device of the embodiment. As shown in FIG. 1, the liquid crystal display device 100 of the embodiment includes an element substrate 10, an opposite substrate 20, and a liquid crystal layer 30. The liquid crystal display device 100 of the embodiment employs a device configuration of a vertical alignment (VA) system ECB mode.

(Element Substrate)

The element substrate 10 includes a TFT substrate 11, a first phase difference layer 12 provided on the surface of the TFT substrate 11 on the liquid crystal layer 30 side, a first alignment film 13 provided on the surface of the first phase difference layer 12 and being in contact with the first phase difference layer 12, and a first polarizer 19 provided on the TFT substrate 11 on the side opposite to the liquid crystal layer 30.

The TFT substrate 11 corresponds to the "first substrate" in an aspect of the present invention.

TFT substrate 11 includes a driving TFT element (not shown). The drain electrode, the gate electrode, and the source electrode of the driving TFT element are electrically connected to a pixel electrode, a gate bus line, and a source bus line, respectively. Pixels are electrically connected to each other via the electrical wiring of the source bus line and the gate bus line.

The materials for forming each member of the TFT substrate 11 can be commonly used materials. As the material of the semiconductor layer of the driving TFT is preferably IGZO (quaternary mixed crystal semiconductor material containing indium (In), gallium (Ga), zinc (Zn), and oxygen (O)). When IGZO is used as a material for forming a semiconductor layer, since the off-leakage current of the resulting semiconductor layer is small, charge leakage is suppressed. Consequently, the idle period after the application of a voltage to the liquid crystal layer can be increased. As a result, the number of times of voltage application during an image display period can be decreased, and the power consumption of the liquid crystal display device can be reduced.

The TFT substrate 11 of the liquid crystal display device may be an active matrix system in which each pixel includes a driving TFT or may be a simple matrix system in which each pixel does not include a driving TFT.

(First Phase Difference Layer)

The first phase difference layer 12 is an optical element formed of a birefringent material to have birefringence and imparting a predetermined phase difference (retardation) to incident straight polarized light. The first phase difference layer 12 of the embodiment is provided directly on a surface of the TFT substrate 11 without an alignment film therebetween.

The material for forming the first phase difference layer 12 is a polymer material having a photofunctional group. The material for forming the first phase difference layer 12 corresponds to the "first polymer material" in an aspect of the present invention, and the photofunctional group possessed by the material for forming the first phase difference layer 12 corresponds to the "first photofunctional group" in an aspect of the present invention.

(First Polymer Material)

The first polymer material includes at least one skeleton selected from the group consisting a polyamic acid skeleton and a (meth)acrylic skeleton, as the main chain skeleton.

The first photofunctional group is a group that absorbs light and causes at least one photoreaction selected from the group consisting of isomerization reaction, dimerization reaction, Fries rearrangement reaction, and cleavage reaction. The first photofunctional group is, for example, at least one group selected from the group consisting of a cinnamate group (Formula (1) shown below), an azobenzene group (Formula (2) shown below), a chalcone group (Formula (3) shown below), a tolane group (Formula (4) shown below), and a cyclobutane group (Formula (5) shown below). The first photofunctional group may be included in the main chain skeleton of the first polymer material or may be included in the side chain of the first polymer material. Since photoreaction readily occurs and the irradiation light amount for causing the photoreaction can be suppressed, the first photofunctional group is preferably included in the side chain of the first polymer material.

[Chem. 1]

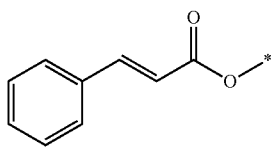

(1)

(wherein, hydrogen atoms may be replaced by monovalent organic groups or fluorine atoms.)

[Chem. 2]

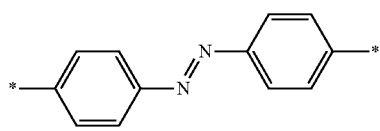

(2)

(wherein, hydrogen atoms may be replaced by monovalent organic groups.)

[Chem. 3]

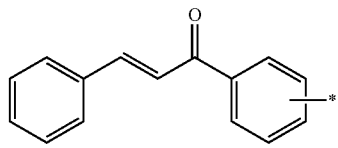

(3)

(wherein, hydrogen atoms may be replaced by monovalent organic groups.)

[Chem. 4]

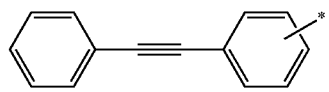

(4)

(wherein, hydrogen atoms may be replaced by monovalent organic groups.)

[Chem. 5]

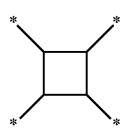

(5)

These photofunctional groups absorb light in the absorption band of each photofunctional group to cause photoisomerization, dimerization reaction, or cleavage reaction.

Specifically, examples of the first polymer material include the followings.

(Material Having Polyamic Acid Skeleton)

Examples of the first polymer material having a polyamic acid skeleton include those having a polyamic acid skeleton represented by the following Formula (10) wherein the X unit included in the polyamic acid is represented by any of the following Formulae (X-1) to (X-7), the E unit is represented by any of the following Formulae (E-1) to (E-14), and either of the X unit and the E unit includes the first photofunctional group. Examples of the first photofunctional group employed in the X unit include those represented by the following Formulae (X-101) to (X-105), and examples of the first photofunctional group employed in the E unit include those represented by the following Formulae (E-101) to (E-105).

[Chem. 6]

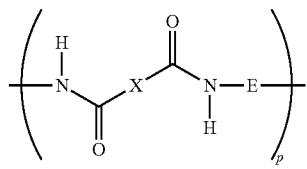

(10)

(wherein, p represents an integer.)

[Chem. 7], [Chem. 8], [Chem. 9], [Chem. 10]

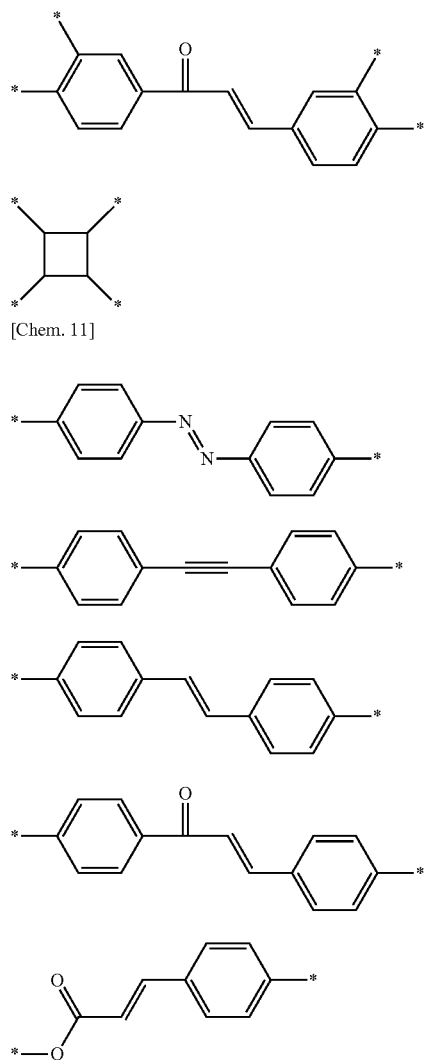

In addition, examples of the first polymer material having a polyamic acid skeleton include those having a polyamic acid skeleton represented by the following Formula (11) wherein the X unit included in the polyamic acid is represented by any of Formulae (X-1) to (X-7) shown above, the E unit is represented by any of the following Formulae (E-21) to (E-36), and the Z unit includes the first photofunctional group. Examples of the first photofunctional group include those represented by the following Formulae (Z-101) to (Z-106).

[Chem. 12]

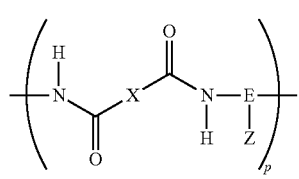

(11)

(wherein, p represents an integer.)

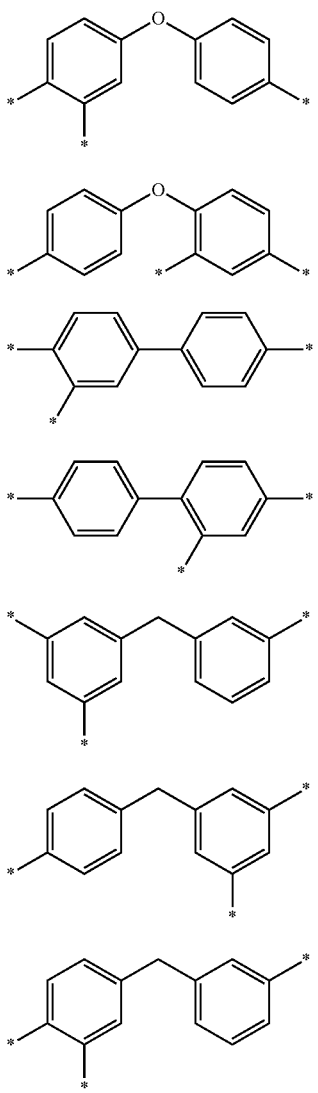

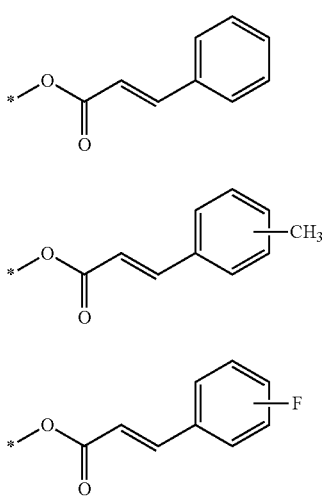

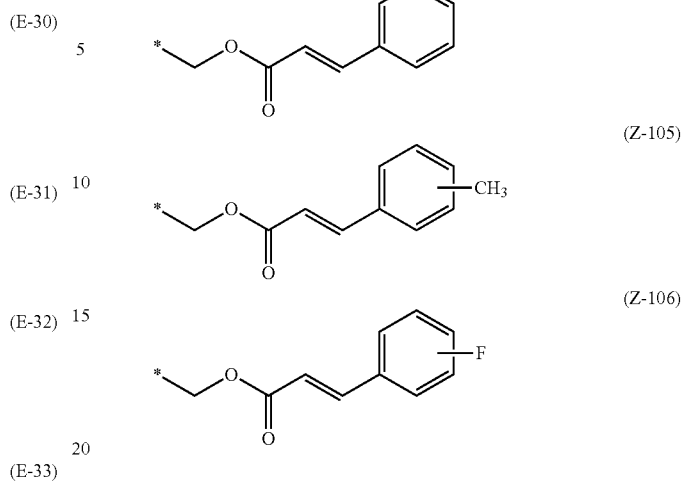

(Material Having Siloxane Skeleton)

Examples of the first polymer material having a siloxane acid skeleton include those having a siloxane skeleton represented by the following Formula (20) or (21) wherein the Z unit provided as a side chain includes the first photofunctional group. Examples of the first photofunctional group include those represented by Formulae (Z-101) to (Z-106) shown above.

[Chem. 16]

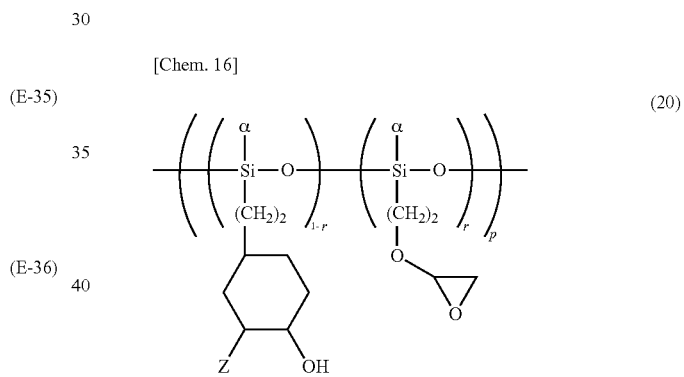

(wherein, α represents any of a hydrogen atom, a hydroxyl group, and an alkoxy group, and the multiple α's may be the same or different from each other.

r is $0 < r \leq 0.5$, and p represents an integer.)

[Chem. 17]

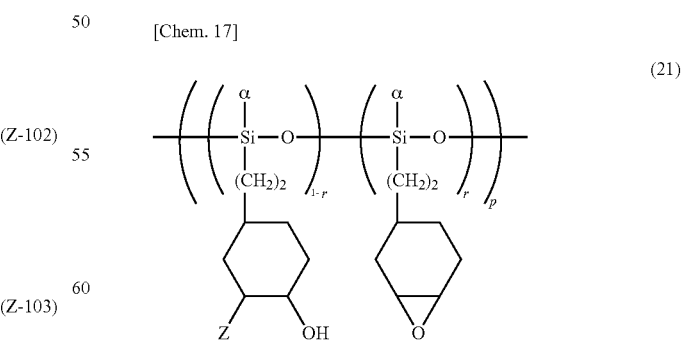

(wherein, α represents any of a hydrogen atom, a hydroxyl group, and an alkoxy group, and the multiple α's may be the same or different from each other.

r is $0 < r \leq 0.5$, and p represents an integer.)

In formation of the first phase difference layer 12, a coating film containing the material for forming the first phase difference layer 12 is first heated. Consequently, the polymer molecules constituting the coating film polymerize with each other to lose the fluidity and cure.

Subsequently, the heated coating film is irradiated with polarized light. Consequently, among the photofunctional groups as described above, the photofunctional group received the polarized light causes photoreaction. As a result, the heated coating film has anisotropy according to the polarized light direction and irradiation direction.

That is, the first phase difference layer 12 formed using the first polymer material as a formation material and being heated and irradiated with polarization light shows birefringence appropriate as a phase difference layer. The in-plane retardation value of the first phase difference layer 12 can be controlled by the type of the first polymer material to be used and controlling the thickness of the first phase difference layer 12.

(First Alignment Film)

The first alignment film 13 has a function of imparting anchoring force to the liquid crystal material being in contact with the surface. The first alignment film 13 may be a vertical alignment film or may be a photo-alignment film imparting a pretilt angle to the liquid crystal material. The photo-alignment film is a film formed of a material having a photofunctional group and imparted with anchoring force by light irradiation.

The material for forming the first alignment film 13 is a polymer material having a photofunctional group. The material for forming the first alignment film 13 corresponds to the "second polymer material" in an aspect of the present invention, and the photofunctional group possessed by the material for forming the the first alignment film 13 corresponds to the "second photofunctional group" in an aspect of the present invention.

(Second Polymer Material)

The second polymer material includes at least one skeleton selected from the group consisting a polyamic acid skeleton and a siloxane skeleton, as the main chain skeleton. Among them, the main chain skeleton of the second polymer material is preferably a siloxane skeleton.

The second photofunctional group is a group that absorbs light and causes at least one photoreaction selected from the group consisting of isomerization reaction, dimerization reaction, and Fries rearrangement reaction. The second photofunctional group is, for example, at least one group selected from the group consisting of a cinnamate group (Formula (1) shown above), a coumarin group (Formula (5) shown below), and a stilbene group (Formula (6) shown below).

[Chem. 18]

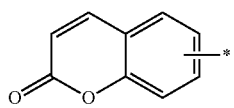

(5)

(wherein, hydrogen atoms may be replaced by monovalent organic groups.)

[Chem. 19]

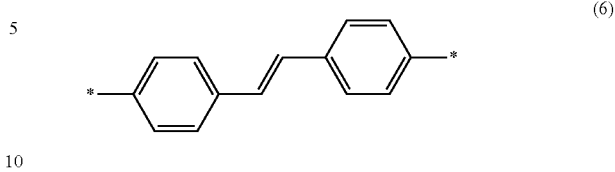

(6)

(wherein, hydrogen atoms may be replaced by monovalent organic groups.)

The second photofunctional group may be directly bonded to a silicon atom included in the above-described siloxane skeleton or may be included in the side chain bonded to the silicon atom. Since photoreaction readily occurs and the irradiation light amount for causing the photoreaction can be suppressed, the second photofunctional group is preferably included in the side chain. In addition, all the side chains are not required to include the photofunctional group, and a non-photoreactive side chain, such as a thermally crosslinking polymerizable functional group, may be included for improving the thermal and chemical stability.

These photofunctional groups absorb polarized light of the absorption band of each photofunctional group to cause photoisomerization or dimerization reaction. As a result, the second photofunctional group absorbs polarized light having a second wavelength to change the conformation, and the first alignment film 13 defines the alignment direction of the liquid crystal material being in contact with the surface in an arbitrary direction. That is, the first alignment film 13 can define the alignment direction of the liquid crystal material in an arbitrary direction according to the irradiation direction of the polarized light having the second wavelength at the time of formation.

Incidentally, the second photofunctional group may be the same functional group as the first photofunctional group. In addition, the second wavelength and the first wavelength may be the same.

Specifically, examples of the second polymer material include the followings.

(Material Having Polyamic Acid Skeleton)

Examples of the second polymer material having a polyamic acid skeleton include those having a polyamic acid skeleton represented by Formula (11) shown above wherein the X unit included in the polyamic acid is represented by any of Formulae (X-1) to (X-7) shown above, the E unit is represented by any of Formulae (E-21) to (E-36) shown above, and the Z unit includes the second photofunctional group. Examples of the second photofunctional group include those represented by the following Formulae (Z-201) to (Z-223).

[Chem. 20]
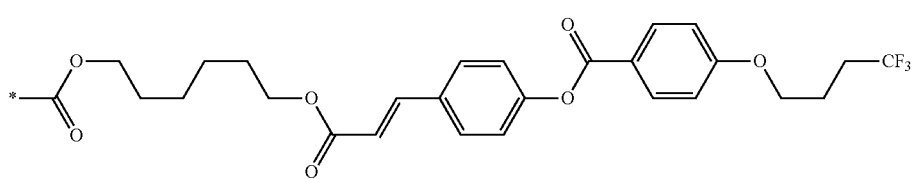
(Z-201)
[Chem. 21]
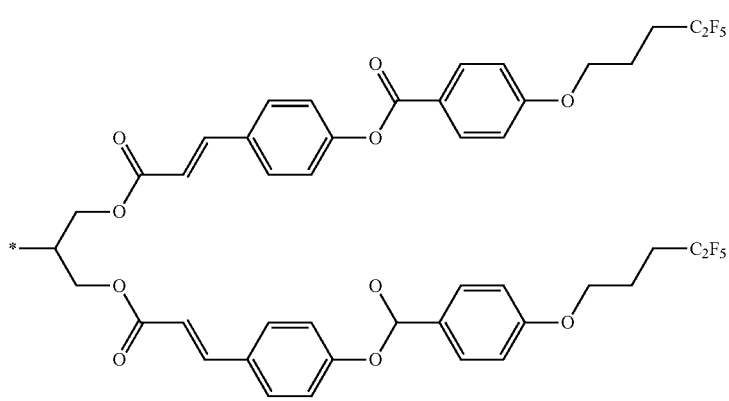
(Z-202)
[Chem. 22]
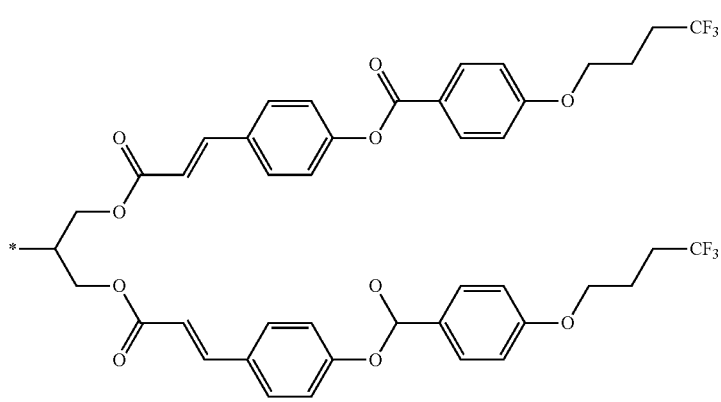
(Z-203)
[Chem. 23]
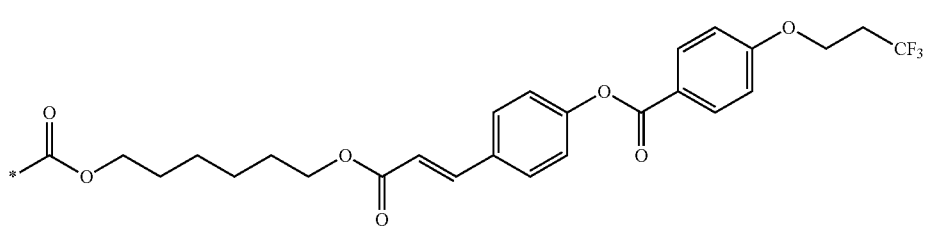
(Z-204)
[Chem. 24]
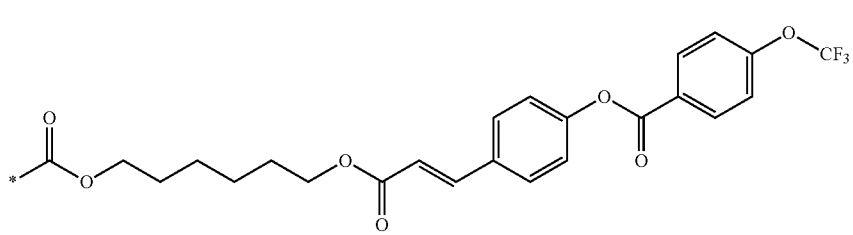
(Z-205)

-continued
[Chem. 25]
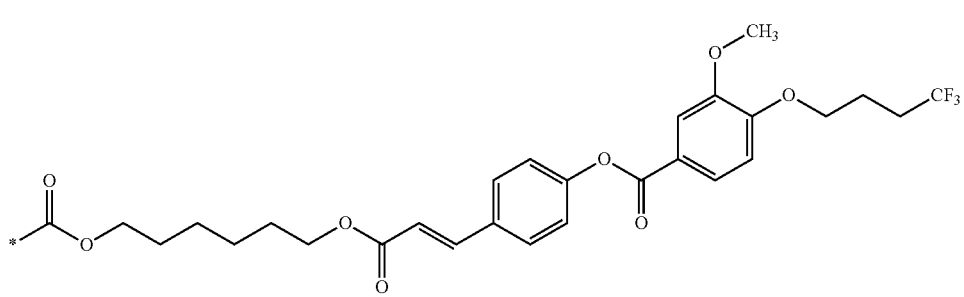
(Z-206)
[Chem. 26]
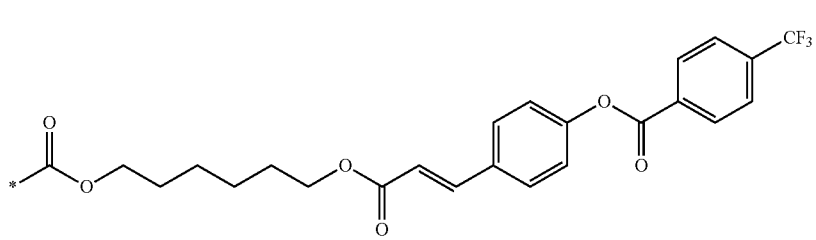
(Z-207)
[Chem. 27]
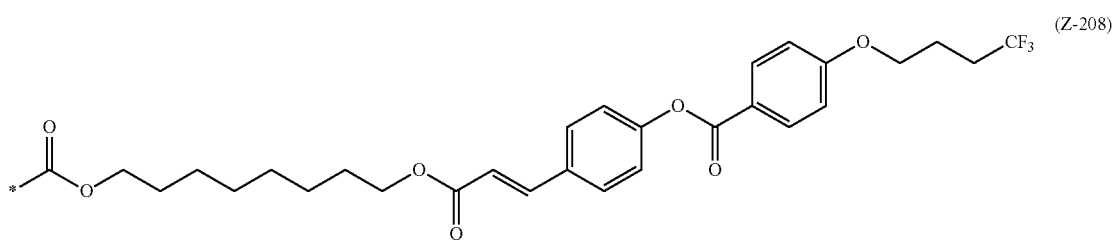
(Z-208)
[Chem. 28]
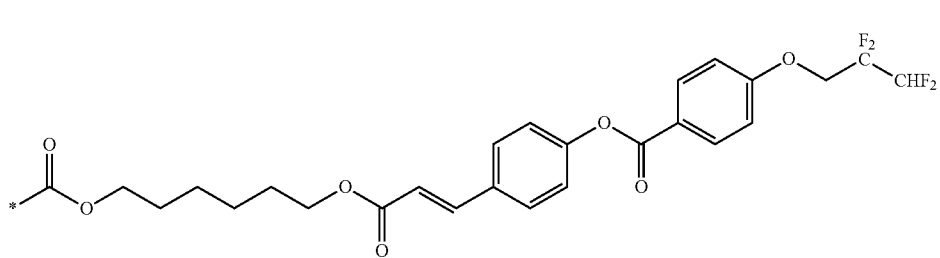
(Z-209)
[Chem. 29]
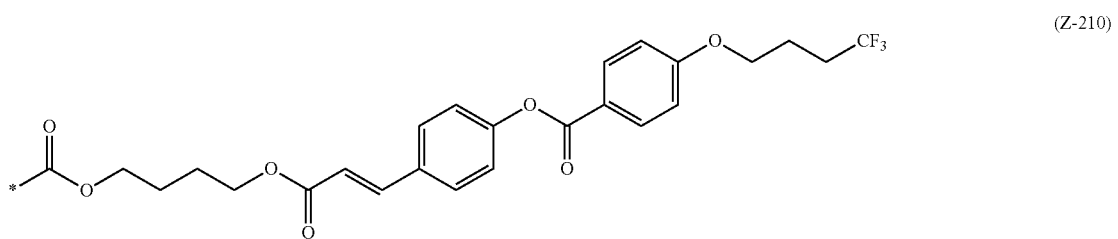
(Z-210)

-continued
[Chem. 30]
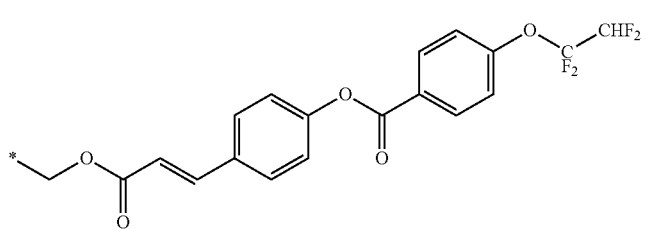
(Z-211)
[Chem. 31]
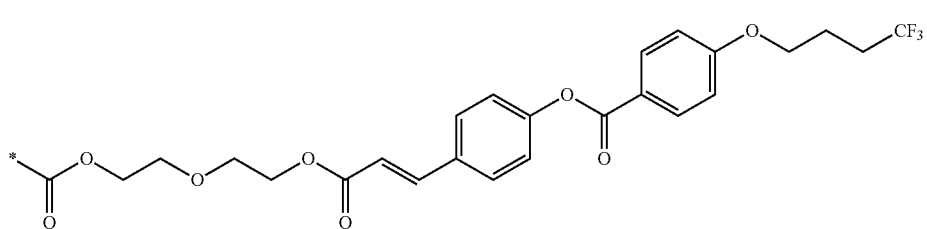
(Z-212)
[Chem. 32]
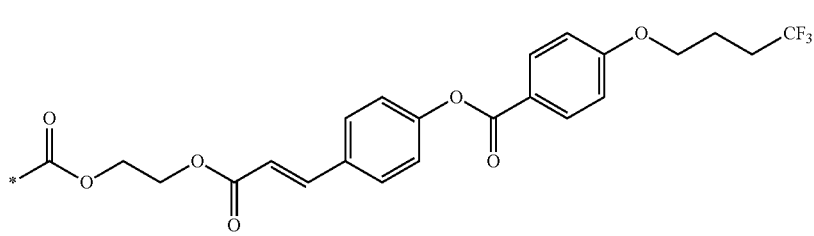
(Z-213)
[Chem. 33]
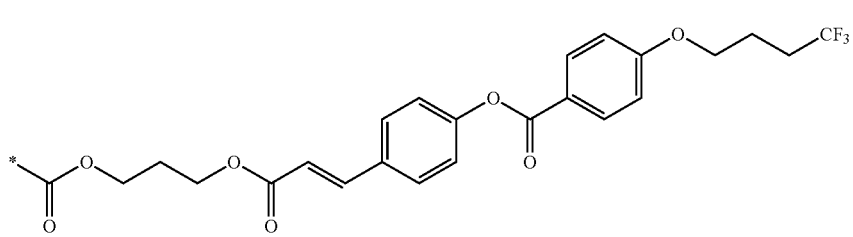
(Z-214)
[Chem. 34]
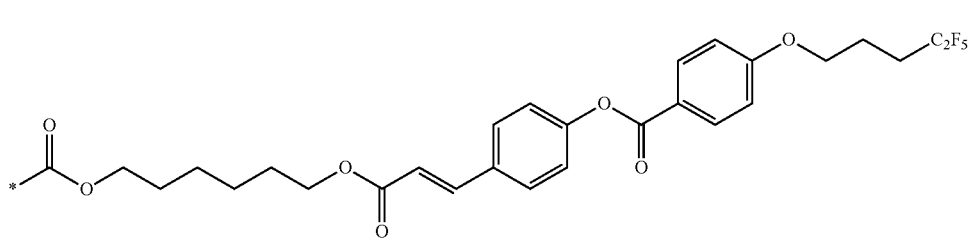
(Z-215)
[Chem. 35]
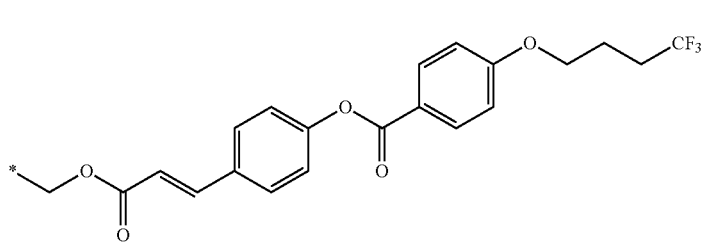
(Z-216)

-continued
[Chem. 36]
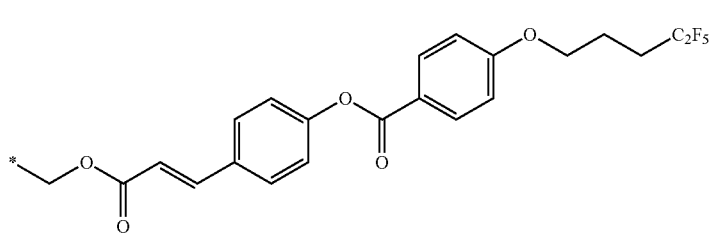
(Z-217)
[Chem. 37]
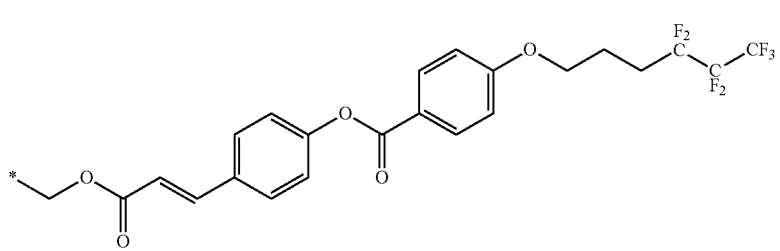
(Z-218)
[Chem. 38]
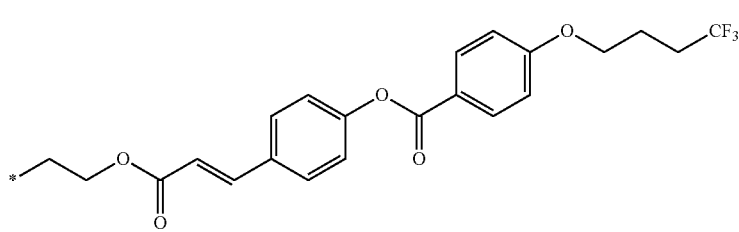
(Z-219)
[Chem. 39]
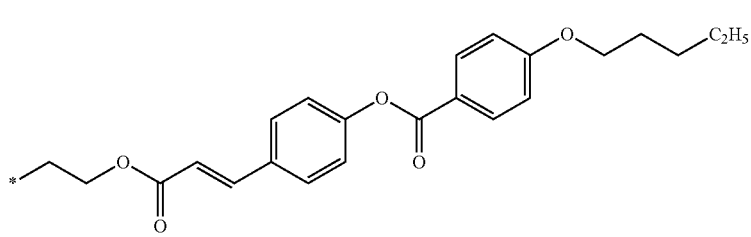
(Z-220)
[Chem. 40]
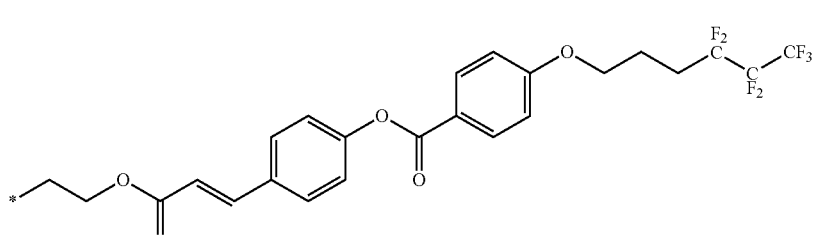
(Z-221)
[Chem. 41]
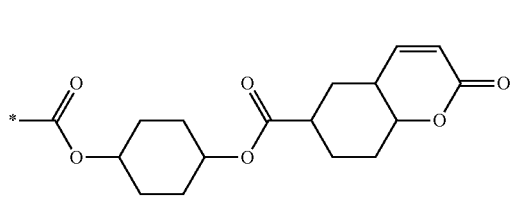
(Z-222)

[Chem. 42]

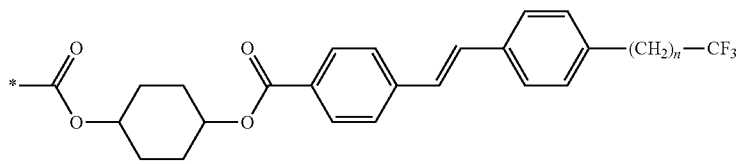
(Z-223)

(Material Having Siloxane Skeleton)

Examples of the second polymer material having a siloxane acid skeleton include those having a siloxane skeleton represented by Formula (20) or (21) shown above wherein the Z unit included as a side chain includes the second photofunctional group. Examples of the second photofunctional group include those represented by the following Formulae (Z-224) and (Z-225).

[Chem. 43]

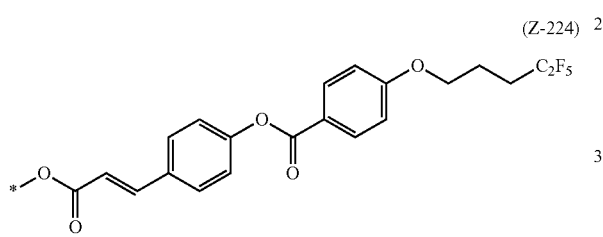
(Z-224)

[Chem. 44]

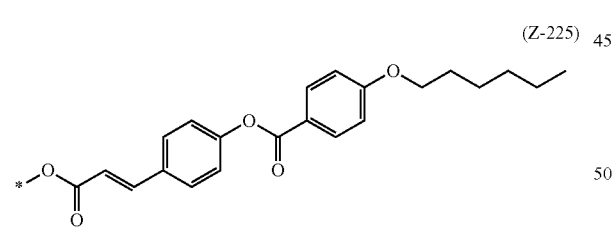
(Z-225)

(Material for Forming Vertical Alignment Film)

Specifically, examples of the material for forming vertical alignment film include the followings.

(Material Having Polyamic Acid Skeleton)

Examples of the material for forming a vertical alignment film having a polyamic acid skeleton include those having a polyamic acid skeleton represented by Formula (11) shown above wherein the X unit included in the polyamic acid is represented by any of Formulae (X-1) to (X-7) shown above, the E unit is represented by any of Formulae (E-21) to (E-36) shown above, and the Z unit is represented by any of the following Formulae (Z-301) to (Z-307).

[Chem. 45]

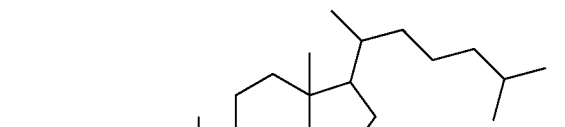
(Z-301)

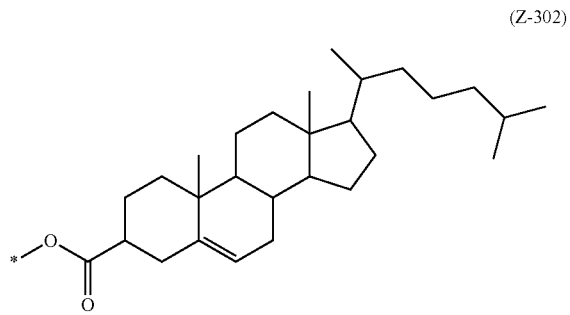
(Z-302)

[Chem. 46]

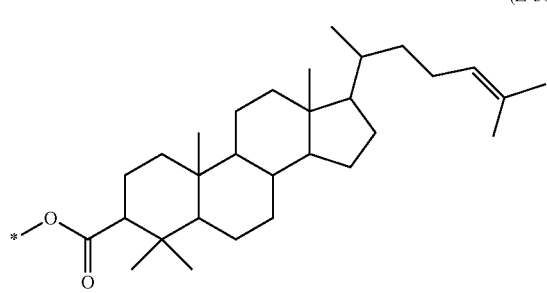
(Z-303)

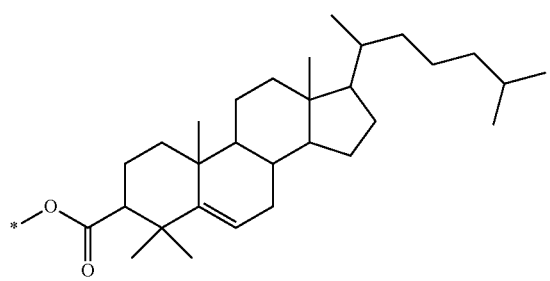
(Z-304)

-continued

[Chem. 47]

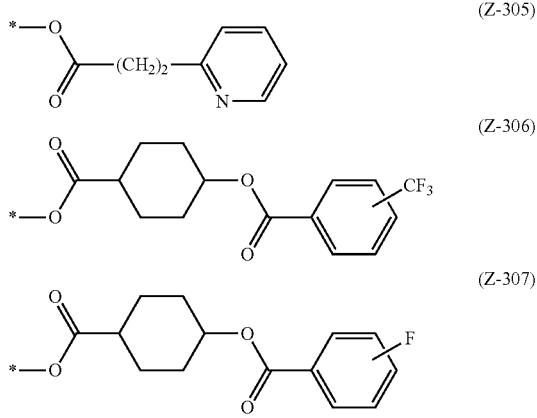

(Z-305)

(Z-306)

(Z-307)

(Material Having Siloxane Skeleton)

Examples of the second polymer material having a siloxane acid skeleton include those having a siloxane skeleton represented by Formula (20) or (21) shown above wherein the Z unit included as a side chain is represented by any of Formulae (Z-301) to (Z-307) shown above.

As the first polarizer 19, those having a usually known configuration can be used.

(Opposite Substrate)

The opposite substrate 20 includes, for example, a color filter substrate 21, a second phase difference layer 22 provided on the surface of the color filter substrate 21 on the liquid crystal layer 30 side, a second alignment film 23 provided on the surface of the second phase difference layer 22 and being in contact with the second phase difference layer 22, and a second polarizer 29 provided on the color filter substrate 21 on the side opposite to the liquid crystal layer 30.

The color filter substrate 21 corresponds to the "second substrate" in an aspect of the present invention.

The color filter substrate 21 includes, for example, a red color filter layer absorbing part of incident light and transmitting red light, a green color filter layer absorbing part of incident light and transmitting green light, and a blue color filter layer absorbing part of incident light and transmitting blue light.

Furthermore, the color filter substrate 21 may include an overcoat layer coating the surface for planarization of the substrate surface and prevention of elution of color material component from the color filter layer.

(Second Phase Difference Layer)

The second phase difference layer 22 is an optical element formed using a birefringent material to have birefringence and imparting a predetermined phase difference (retardation) to incident straight polarized light. The second phase difference layer 22 of the embodiment is provided directly on a surface of the color filter substrate 21 without an alignment film therebetween.

The material for forming the second phase difference layer 22 may be the same as the first polymer material described above. The retardation value of the second phase difference layer 22 may be the same as or different from that of the first phase difference layer 12.

(Second Alignment Film)

The second alignment film 23 has a function of imparting anchoring force to the liquid crystal material being in contact with the surface. The second alignment film 23 may be a vertical alignment film or may be a photo-alignment film imparting a pretilt angle to the liquid crystal material.

However, one of the first alignment film 13 and the second alignment film 23 is a photo-alignment film imparting a pretilt angle to the liquid crystal material. When the first alignment film 13 is a photo-alignment film or when the second alignment film 23 is a photo-alignment film, the pretilt angle imparted to the liquid crystal material by these films is 75° or more and less than 90°. The pretilt angle is preferably 80.0° or more. In addition, the pretilt angle is preferably 88.5° or less and more preferably less than 88.5°. The upper limit and the lower limit of the pretilt angle can arbitrarily be combined.

When both the first alignment film 13 and the second alignment film 23 are photo-alignment films, the pretilt angle imparted to the liquid crystal material by the first alignment film 13 and the pretilt angle imparted to the liquid crystal material by the second alignment film 23 may be the same or different.

When both the first alignment film 13 and the second alignment film 23 are photo-alignment films, the alignment direction of the liquid crystal material by the first alignment film 13 and the alignment direction of liquid crystal material by the second alignment film 23 are preferably set to antiparallel alignment in the field of view from the normal direction of the TFT substrate 11 (the field of view when the TFT substrate is planarly viewed). The term "antiparallel alignment" refers to that the azimuth angles of the liquid crystal materials are the same in the field of view when the TFT substrate is planarly viewed.

The material for forming the second alignment film 23 may be the same as the second polymer material described above.

As the second polarizer 29, those having a usually known configuration can be used. The first polarizer 19 and the second polarizer 29 are disposed, for example, in a crossed-Nicol arrangement.

(Liquid Crystal Layer)

The liquid crystal layer 30 contains a liquid crystal material. The liquid crystal material is a composition including liquid crystal molecules having liquid crystallinity. The liquid crystal material may be composed of only liquid crystal molecules solely expressing liquid crystallinity or may be a composition that is a mixture of liquid crystal molecules solely expressing liquid crystallinity and an organic compound not solely expressing liquid crystallinity and expresses liquid crystallinity as a whole composition. The liquid crystal material used is negative liquid crystal of which the dielectric anisotropy is negative. The liquid crystal molecules are imparted with orientation according to the anchoring force of the first alignment film 13 or the second alignment film 23 in a voltage non-applied state.

Additionally, the liquid crystal display device 100 may include a sealing portion sandwiched between the element substrate 10 and the opposite substrate 20 and surrounding the circumference of the liquid crystal layer 30 and a spacer that is a columnar structure for defining the thickness of the liquid crystal layer 30.

The liquid crystal display device having such a configuration can easily change the pretilt angle while suppressing a decrease in contrast.

That is, in the liquid crystal display device, the angle (pretilt angle) of the liquid crystal material with respect to the substrate in a voltage non-applied state may be controlled for improving the viewing angle or enhancing the definition. However, a change in the pretilt angle of a liquid crystal material causes a change in the magnitude of retardation occurring in polarized light passing through the liquid crystal layer, leading to light leakage at the time of black display. As a result, a problem that the black display becomes bright to decrease the contrast, which is the ratio of the brightness at the time of black display to the brightness at the time of white display, tends to occur.

However, in the liquid crystal display device of the embodiment, light leakage at the time of black display can be suppressed by imparting, to the phase difference layer (the first phase difference layer or the second phase difference layer), retardation that cancels the change in the retardation of the liquid crystal layer occurring at the time of controlling the pretilt angle.

In the liquid crystal display device having such a configuration, the phase difference to be imparted to the phase difference layer can be controlled by changing various conditions, such as the irradiation amount of polarized light in the formation of the phase difference layer, the irradiation angle of polarized light irradiated on the phase difference layer with respect to the alignment direction of the liquid crystal, the material for forming the phase difference layer, and the thickness of the phase difference layer. Accordingly, it is possible to appropriately control the retardation value that should be possessed by the phase difference layer (the first phase difference layer or the second phase difference layer) even if the retardation caused by a change in the pretilt angle of the liquid crystal material is minute.

For example, a liquid crystal display device of a vertical alignment system having a predetermined pretilt angle and expressing desired contrast is used as reference, and when the pretilt angle is changed in the configuration of the reference liquid crystal display device while suppressing a decrease in contrast, the retardation value (the total of the retardation value of the first phase difference layer and the retardation value of the second phase difference layer) that should be possessed by the phase difference layer can be roughly estimated by the following Expressions (1) to (3).

[Math. 1]

$$Re(photo) = \Delta n \times d[\sqrt{(n_e^2 + n_o^2)} \times \cos\{\theta - (X - \alpha)\} - n_o] \times C \quad (1)$$

[Math. 2]

$$\Delta n = |n_e - n_o| \quad (2)$$

[Math. 3]

$$\sqrt{(n_e^2 + n_o^2)} \times \cos\theta = n_o \quad (3)$$

In Expressions, Re(photo) represents the retardation value of the phase difference layer and is preferably 0.1 nm or more and 10 nm or less.

d represents the thickness (unit: nm) of the liquid crystal layer.

$n_e$ represents an extraordinary light refractive index of the liquid crystal material constituting the liquid crystal layer.

$n_o$ represents an ordinary light refractive index of the liquid crystal material constituting the liquid crystal layer.

θ represents the angle formed by the vector of $n_o$ and the composite vector of the vector of $n_o$ and the vector of $n_e$ when the liquid crystal layer is assumed as a refractive index ellipsoid.

X represents the pretilt angle (unit: °) of the photo-alignment film of an existing liquid crystal display device (reference liquid crystal display device) expressing a desired contrast ratio and is 75° or more and less than 90°. In the reference liquid crystal display device, when the pretilt angles imparted to the liquid crystal material by a pair of alignment films are different from each other, X represents the average of the pretilt angles by the pair of alignment films.

α represents the changed pretilt angle (unit: °) of the liquid crystal display device. In the liquid crystal display device after the change, when the pretilt angles imparted to the liquid crystal material by a pair of alignment films are different from each other, a represents the smaller pretilt angle.

C represents a coefficient depending on the (polar angle) anchoring intensity of the liquid crystal layer. A larger anchoring intensity of the liquid crystal layer tends to increase the coefficient C. Here, the alignment direction of the liquid crystal layer is set in the 45° direction with respect to the crossed-Nicol polarizer. The coefficient C is 0.01 to 0.20.

Here, the coefficient C can be determined by, for example, as follows.

First, two or more liquid crystal cells in which only the pretilt angles imparted to the photo-alignment films are different are produced using the material for forming the photo-alignment film of a reference liquid crystal display device and the material (liquid crystal material) of the liquid crystal layer of the reference liquid crystal display device. On this occasion, the azimuth angles of the pretilt angles are set to be the same as that of the reference liquid crystal display device.

Subsequently, the retardation of each of the resulting liquid crystal cells is measured.

Subsequently, a graph (scatter diagram) for the pretilt angles and the measured retardation is formed based on measured values with the horizontal axis representing the pretilt angle and the vertical axis representing the retardation value. A graph separately formed based on Expression (1) shown above is superimposed on the scatter diagram. On this occasion, the coefficient C in Expression (1) is changed to determine a coefficient C so that the measured retardation values and the graph based on Expression (1) appropriately agree with each other (fitting of Expression (1) to the measured values). Thus, the coefficient C is determined.

The coefficient C may be determined from measured values as described above or may be determined using simulation results instead of measured values. The simulation can be performed using, for example, LCD Master (manufactured by Shintech Inc.).

For example, when a liquid crystal display device of a transmitted light intensity that is equivalent to that of an existing liquid crystal display device (e.g., an existing liquid crystal display device having a pretilt angle of 88.5°) is manufactured at a pretilt angle of 87°, an appropriate retardation value, Re(photo), of the phase difference layer can be estimated by using Expression (1) shown above.

In the embodiment, although the second phase difference layer 22 is employed, a polymer layer (hereinafter referred to as underlayer) having no in-plane phase difference may be used instead of the second phase difference layer 22. As the material for forming the underlayer, a polymer material having the same main chain skeleton as that of the first polymer material or the second polymer material described above and having no photofunctional group can be used. In addition, as the material for forming the underlayer, the material for forming the vertical alignment film described above can also be employed.

Specifically, examples of the material for forming the underlayer include the followings.

Examples of the material having a polyamic acid skeleton for the underlayer include those having a polyamic acid skeleton represented by Formula (11) shown above wherein the X unit included in the polyamic acid is represented by any of Formulae (X-1) to (X-7) shown above, the E unit is represented by any of Formulae (E-21) to (E-36) shown above, and the Z unit is represented by any of the following Formulae (Z-401) to (Z-408).

[Chem. 48]

*—COOH (Z-401)

*—COOCH$_3$ (Z-402)

*—COOC$_2$H$_5$ (Z-403)

*—COOCF$_3$ (Z-404)

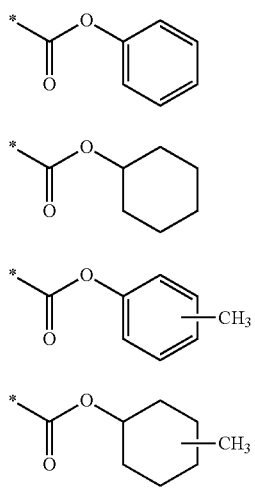

-continued (Z-405)

(Z-406)

(Z-407)

(Z-408)

Additionally, as the material for forming the underlayer, the material having a polyamic acid skeleton for forming the vertical alignment film or the material having a siloxane skeleton for forming the vertical alignment film described above can also be used.

In addition, the second alignment film 23 may be formed directly on the surface of the color filter substrate 21, without forming the second phase difference layer 22.

Furthermore, in the embodiment, the TFT substrate 11 included in the element substrate 10 is defined as the "first substrate" in an aspect of the present invention, and the element substrate 10 always has a phase difference layer (first phase difference layer 12), but the configuration is not limited thereto. The TFT substrate 11 is defined as the "first substrate" and the color filter substrate 21 is defined as the "second substrate" as a matter of convenience in the embodiment, and the configuration may be that the color filter substrate 21 is defined as the "first substrate" and the opposite substrate 20 is always has a phase difference layer.

That is, the configurations that can be employed in the liquid crystal display device of an aspect of the present invention are shown in Table 1.

TABLE 1

| No | First substrate side | | | Second substrate side | | |
|---|---|---|---|---|---|---|
| 1 | First substrate | First phase difference layer | Photo-alignment film | Photo-alignment film | Second phase difference layer | Second substrate |
| 2 | | First phase difference layer | Photo-alignment film | Photo-alignment film | Underlayer | |
| 3 | | First phase difference layer | Photo-alignment film | Photo-alignment film | — (None) | |
| 4 | | First phase difference layer | Photo-alignment film | Vertically aligned film | Second phase difference layer | |
| 5 | | First phase difference layer | Photo-alignment film | Vertically aligned film | Underlayer (without vertically aligned film) | |
| 6 | | First phase difference layer | Photo-alignment film | Vertically aligned film | — | |
| 7 | | First phase difference layer | Vertically aligned film | Photo-alignment film | Second phase difference layer | |
| 8 | | First phase difference layer | Vertically aligned film | Photo-alignment film | Underlayer | |
| 9 | | First phase difference layer | Vertically aligned film | Photo-alignment film | — | |

Figure 2:
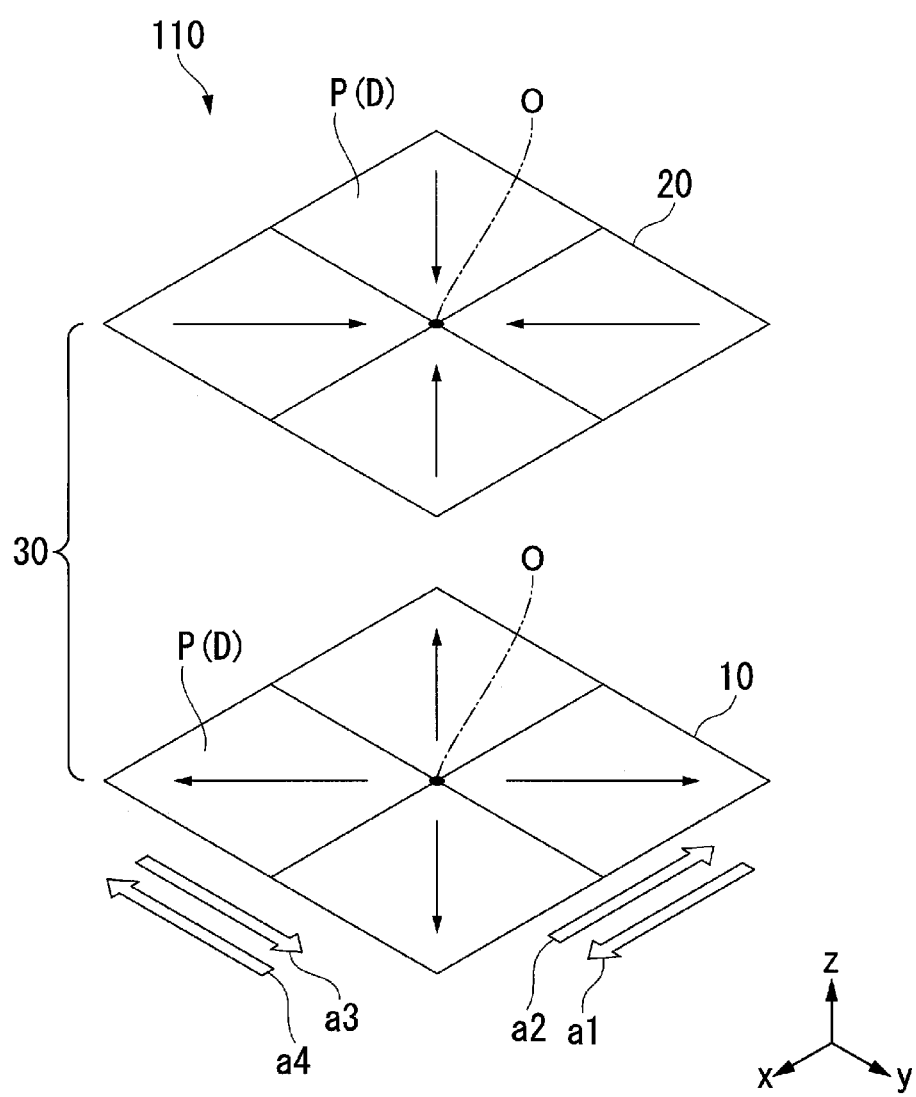
FIG. 2 is a diagram showing a relationship between the liquid crystal alignment direction and the slow axis of the first phase difference layer in the liquid crystal display device of a First embodiment.
Figure 3:
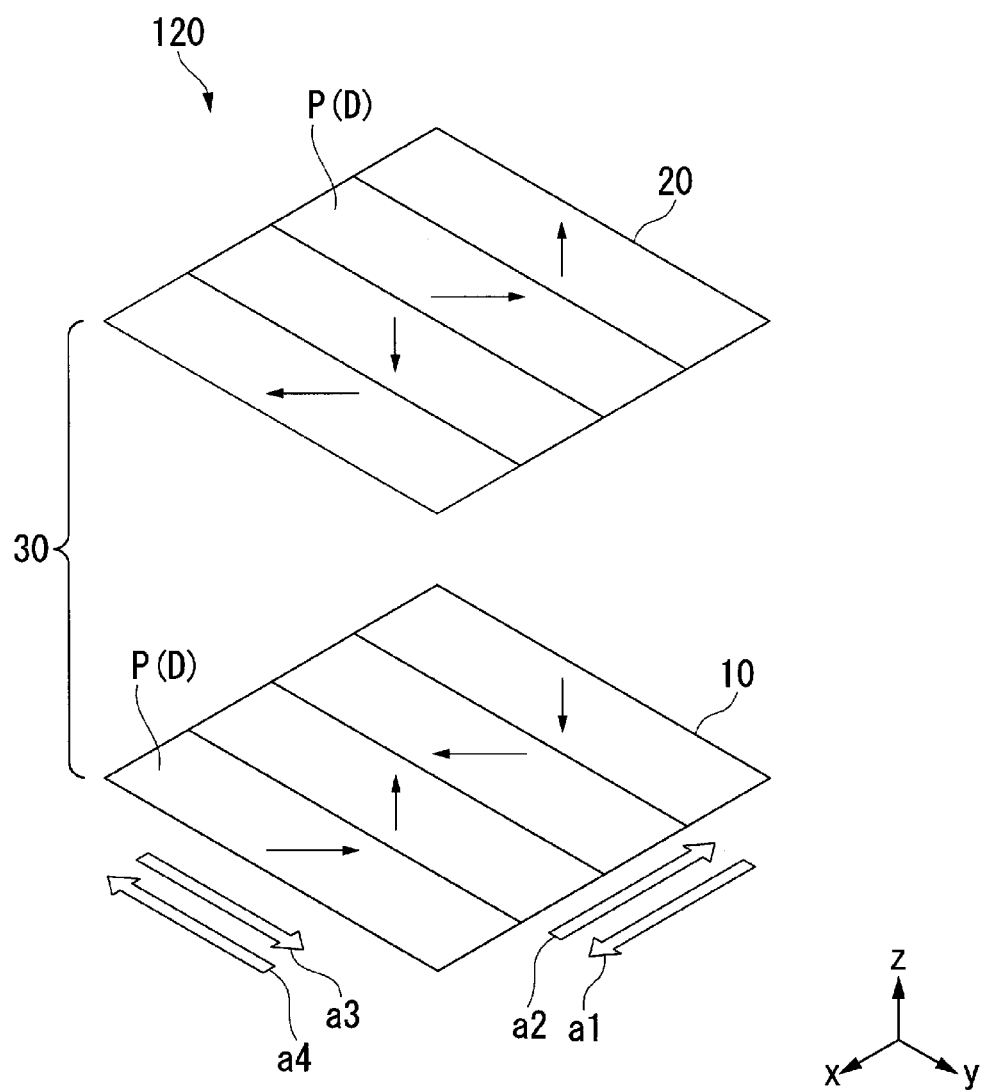
FIG. 3 is a diagram showing a relationship between the liquid crystal alignment direction and the slow axis of the first phase difference layer in the liquid crystal display device of a First embodiment.

FIGS. 2 and 3 are explanatory drawings of configurations that can be employed in the liquid crystal display device of the embodiment and each show a relationship between the liquid crystal alignment direction and the slow axis of the first phase difference layer. In the configuration of each of the liquid crystal display devices shown in FIGS. 2 and 3, a pair of substrates include photo-alignment films, respectively, each having a pretilt angle (Nos. 1 to 3 in Table 1 shown above). The configurations of the liquid crystal display devices in FIGS. 2 and 3 are those called "4D-ECB (electrically controlled birefringence)".

In FIGS. 2 and 3, the direction along one side each of the element substrate 10 and the opposite substrate 20 drawn as rectangles is defined as the x-axis direction, the direction perpendicular to the x-axis direction in the substrate plane is defined as the y-axis direction, and the direction perpendicular to both the x-axis direction and the y-axis direction (i.e., the vertical direction) is defined as the z-axis direction.

FIG. 2 illustrates pixels P arranged in a 2×2 matrix form possessed by the liquid crystal display device 110. The regions of the element substrate 10 and the opposite substrate 20 are each divided into domains D corresponding to the respective pixels P.

In the element substrate 10 and the opposite substrate 20, the liquid crystal alignment directions shown by arrows, i.e., the azimuth angle of the pretilt direction of the liquid crystal molecules imparted in the photo-alignment film is defined for each domain D. Specifically, in the element substrate 10, the liquid crystal alignment directions are defined, in directions away from the intersection O of the four domains D, in the directions of 45° and 135° with respect to the y-axis in the +x direction and the directions of 45° and 135° with respect to the y-axis in the −x direction.

In addition, in the opposite substrate 20, the liquid crystal alignment directions are defined, in directions approaching the intersection O of the four domains D, in the directions of 45° and 135° with respect to the y-axis in the +x direction and the directions of 45° and 135° with respect to the y-axis in the −x direction.

By stacking the element substrate 10 and the opposite substrate 20 in which the liquid crystal alignment directions are set as described above, the liquid crystal alignment directions in each domain become antiparallel (ECB mode alignment). In such liquid crystal display device 110, in four adjacent pixels P, the liquid crystal alignment direction of a first pixel, the liquid crystal alignment direction of a second pixel, the liquid crystal alignment direction of a third pixel, and the liquid crystal alignment direction of a fourth pixel are different from one another. In addition, in four adjacent pixels P, the liquid crystal alignment direction of an arbitrary pixel differs from the liquid crystal alignment directions of the remaining three pixels by integer multiples of 90°.

In the liquid crystal display device 110 of such a configuration, the slow axis of the first phase difference layer is set in any of the +x direction (sign a1), −x direction (sign a2), +y direction (sign a3), and −y direction (sign a4). By thus setting, the slow axis of the first phase difference layer and the liquid crystal alignment direction of each domain cross each other at 45° or 135°.

FIG. 3 illustrates pixels P which are possessed by the liquid crystal display device 120 and arranged side by side in the −y direction (arranged in a 1×4 matrix form). The regions of the element substrate 10 and the opposite substrate 20 are each divided into domains D corresponding to the respective pixels P.

In the element substrate 10 and the opposite substrate 20, the liquid crystal alignment direction, i.e., the azimuth angle of the pretilt direction of the liquid crystal molecules imparted in the photo-alignment film is defined for each domain D. Specifically, in the element substrate 10, the liquid crystal alignment directions are defined in the direction of 45° with respect to the y-axis in the −x direction, the direction of 135° with respect to the y-axis in the −x direction, the direction of 135° with respect to the y-axis in the +x direction, and the direction of 45° with respect to the y-axis in the +x direction.

In addition, in the opposite substrate 20, the liquid crystal alignment directions are defined in the direction of 135° with respect to the y-axis in the +x direction, the direction of 45° with respect to the y-axis in the +x direction, the direction of 45° with respect to the y-axis in the −x direction, and the direction of 135° with respect to the y-axis in the −x direction.

By stacking the element substrate 10 and the opposite substrate 20 in which the liquid crystal alignment directions are set as described above, the liquid crystal alignment directions in each domain become antiparallel (ECB mode alignment).

In also the liquid crystal display device 120 of such a configuration, the slow axis of the first phase difference layer is set in any of the +x direction, −x direction, +y direction, and −y direction. By thus being set, the slow axis of the first phase difference layer and the liquid crystal alignment direction of each domain cross each other at 45° or 135°.

The liquid crystal display devices imparted with liquid crystal alignment directions as shown in FIGS. 2 and 3 can be manufactured by a commonly known method using proximity exposure.

The liquid crystal display devices shown in FIGS. 2 and 3 may have a configuration in which the liquid crystal alignment direction of one of the element substrate 10 and the opposite substrate 20 is changed by 90°. The liquid crystal display device of such a configuration is called a "4D-RTN (reverse twisted nematic)" liquid crystal display device.

The liquid crystal display device of the embodiment has the above-described configuration.

In the liquid crystal display device having a configuration as described above, it is possible to provide a liquid crystal display device that can easily suppress a decrease in contrast even if the pretilt angle is controlled.

Second Embodiment

FIG. 4 is a flow chart showing a method for manufacturing a liquid crystal display device according to a Second Embodiment of the present invention.

The method for manufacturing a liquid crystal display device of the embodiment will now be described along with the flow chart of FIG. 4.

Incidentally, the manufacturing method of the embodiment can be applied to both the production of the element substrate 10 and the production of the opposite substrate 20 described above. Accordingly, in the following description, the substrate on which a phase difference layer or an alignment film is formed is simply referred to as "substrate", without restricting to "TFT substrate 11" or "color filter substrate 21". Similarly, the phase difference layer and the alignment film to be formed on a substrate will be also described by simply referring to as "phase difference layer" and "alignment film", respectively, without restricting to "first phase difference layer", "second phase difference layer", "first alignment film", or "second alignment film".

(Step of Forming Laminated Film)

First, a mixture solution containing a first polymer material having a first photofunctional group and a second polymer material having a second photofunctional group in a side chain is applied to a substrate (Step S1).

The photofunctional group selected as the first photofunctional group does not cause photoreaction by polarized light having a wavelength by which the second photofunctional group causes photoreaction.

In addition, the photofunctional group selected as the second photofunctional group does not cause photoreaction by polarized light having a wavelength by which the first photofunctional group causes photoreaction.

The method for applying the solution may be any known method that gives a coating film having a desired thickness. For example, spin coating, bar coating, ink jetting, slit coating, or screen printing can be employed. In the embodiment, the solution is applied by spin coating.

Subsequently, the solvent is removed from the applied mixture solution, and calcination is further performed for drying to form a laminated film composed of a first coating film formed of the first polymer material and a second coating film formed of the second polymer material (Step S2).

In the removal of the solvent, the solvent may be removed by still standing, heating, pressure reduction, ventilation, or combination thereof to accelerate drying.

Since the hydrophobicity of the side chain of the second polymer material is higher than that of the first polymer material, the second polymer material is layer-separated from the first polymer material so as to be positioned on the air interface side during firing.

(Step of Heating Laminated Film)

Subsequently, the formed laminated film is heated (Step S3). Consequently, the first polymer material molecules and the second polymer material molecules are respectively polymerized to lose fluidity and cure.

(Step of Irradiation with First Polarized Light)

Subsequently, the heated laminated film is irradiated with first polarized light having a wavelength by which photoreaction occurs in the first photofunctional group (Step S4). Irradiation with the first polarized light is performed from, for example, the normal direction of the substrate.

Here, the photofunctional group used as the first photofunctional group causes photoreaction by the first polarized light but does not cause photoreaction by second polarized light having a wavelength by which the second photofunctional group causes photoreaction. Consequently, photoreaction occurs only in the first photofunctional group to form a phase difference layer.

(Step of Irradiation with Second Polarized Light)

Subsequently, the heated laminated film is irradiated with second polarized light having a wavelength by which photoreaction occurs in the second photofunctional group (Step S5). The irradiation with the second polarized light is performed from, for example, a direction tilted by 45° with respect to the normal direction of the substrate.

Here, the photofunctional group used as the second photofunctional group causes photoreaction by the second polarized light but does not cause photoreaction by first polarized light having a wavelength by which the first photofunctional group causes photoreaction. Consequently, the first photofunctional group forming the phase difference layer does not cause photoreaction, and photoreaction occurs only in the second photofunctional group to form a photo-alignment film.

In addition, the intensity of the second polarized light is set to be lower than the intensity of the first polarized light. For example, when the intensity of the first polarized light is 2 J/cm$^2$, the intensity of the second polarized light is set to be about 50 mJ/cm$^2$.

By setting the intensity of the second polarized light to be lower than the intensity of the first polarized light, the second polarized light hardly reaches the first photofunctional group forming the phase difference layer, and thereby photoreaction tends to occur only in the second photofunctional group.

In the method for manufacturing a liquid crystal display device of such a configuration, the phase difference imparted to the phase difference layer can be easily controlled by changing various conditions, such as the irradiation amount of the first polarized light, the irradiation angle of the first polarized light with respect to the alignment direction of the liquid crystal material by the photo-alignment film, the material for forming the phase difference layer, and the thickness of the phase difference layer. Accordingly, it is possible to appropriately control the retardation value that should be possessed by the phase difference layer (the first phase difference layer or the second phase difference layer) even if the retardation caused by a change in the pretilt angle of the liquid crystal material is minute.

Accordingly, in the method for manufacturing such a liquid crystal display device, it is possible to easily manufacture a liquid crystal display device that can suppress a decrease in contrast.

Third Embodiment

FIG. 5 is a cross-sectional view schematically illustrating a liquid crystal display device 150 of Third Embodiment and corresponds to the view of FIG. 1. As shown in FIG. 5, the liquid crystal display device 150 of the embodiment includes an element substrate 15, an opposite substrate 25, and a liquid crystal layer 30.

The element substrate 15 includes an alignment sustaining layer 16 provided on the surface of the first alignment film 13 on the liquid crystal layer 30 side. The opposite substrate 25 includes an alignment sustaining layer 26 provided on the surface of the second alignment film 23 on the liquid crystal layer 30 side.

The alignment sustaining layers 16 and 26 are each formed of a photopolymerization product and define the alignment direction of the liquid crystal molecules of the liquid crystal layer 30 when no voltage is applied to the liquid crystal layer 30 and have a function of improving the anchoring force. The material for forming each of the alignment sustaining layers 16 and 26 is, for example, as a polymerizable monomer, dimethacrylate represented by Formula (30) or Formula (31).

[Chem. 49]

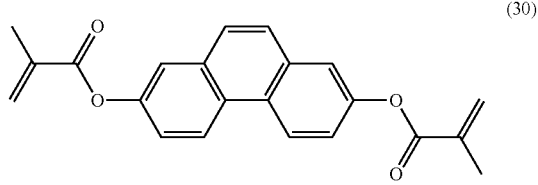

(30)

[Chem. 50]

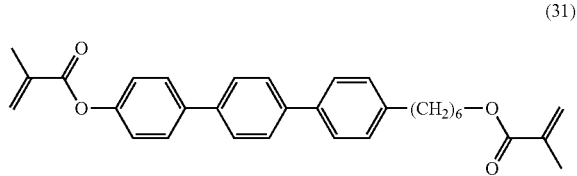

(31)

In formation of the alignment sustaining layer, dimethacrylate such as mentioned above is added in an amount of 0.5 mass % or less based on 100 mass % of a liquid crystal material to be used for the liquid crystal layer 30. A pair of substrates are adhered using such a liquid crystal material, and irradiation with black light (wavelength: 320 nm) of unpolarized light is then performed for 20 minutes (5 J/cm$^2$) in a voltage non-applied state. Consequently, an alignment sustaining layer is formed as if the dimethacrylate as mentioned above fell and accumulated on the surface of the alignment film.

The liquid crystal display device 150 having such alignment sustaining layers 16 and 26 is prevented from changing the VHR (voltage holding ratio), residual DC voltage, and pretilt angle from changing to show high quality, in addition to the effects of an aspect of the present invention.

Preferred embodiments according to an aspect of the present invention have been described with reference to the attached drawings, but it should be noted that the present invention is not limited to such examples. The shapes, combinations, etc. of each component shown in the above-described examples are merely examples, and various modifications can be made based on, for example, design requirements without departing from the gist of the present invention.

EXAMPLES

An aspect of the present invention will now be described by examples, but the present invention is not limited these examples.

The physical properties of the liquid crystal cells of Examples and Comparative Examples produced as described below were evaluated by the following methods.

(Contrast)

Contrast was measured in a darkroom with SR-UL1 luminance meter manufactured by Topcon Corporation.

Measurement temperature: 25° C., Measurement wavelength range: 380 to 780 nm (Response Characteristics)

Measurement was performed with Photal 5200 (Otsuka Electronics Co., Ltd.).

Measurement temperature: 25° C., Measurement: between voltages of a transmittance of 0.5 to the maximum transmittance VHR (voltage holding ratio): The VHR was measured with a VHR measurement system mode 6254 manufactured by TOYO Corporation under conditions of 1 V and 70° C. Here, VHR means the retention rate of the charge charged during one frame period. A liquid crystal display device having a higher VHR is judged to be a good quality product.

Residual DC: The residual DC was measured by a flicker erasing method. The residual DC (rDC) after application of a DC voltage offset voltage of 2 V (AC voltage of 3 V (60 Hz)) for 2 hours was measured. A liquid crystal display device having a lower rDC is judged to be a good quality product.

Change amount of pretilt angle: The change amount between the pretilt angle before energization and the pretilt angle after energization with an AC voltage of 7.5 V was measured. A liquid crystal display device showing a less change amount in the pretilt angle is judged to be a good quality product.

Evaluation 1

Example 1

A paint containing a mixture of the polyamic acid represented by the following Formula (101) and the polyamic acid represented by the following Formula (102) was applied to one surface of a substrate including an ITO electrode (hereinafter, referred to as substrate A) to form a film. The polyamic acid represented by the following Formula (101) and the polyamic acid represented by the following Formula (102) used each had a weight average molecular weight of 10000 or more.

[Chem. 51]

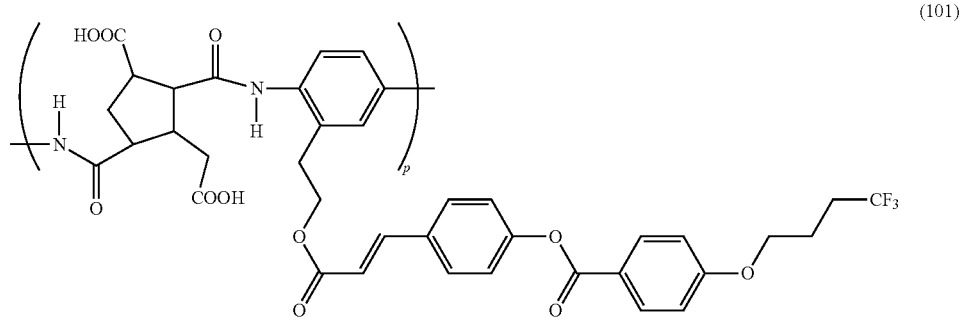

(101)

(wherein, p represents an integer.)

[Chem. 52]

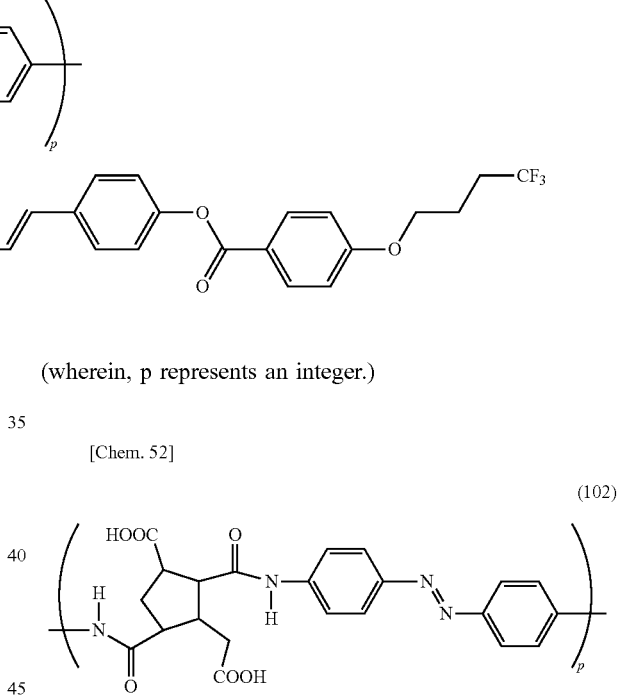

(102)

(wherein, p represents an integer.)

Subsequently, firing was performed to form a layered product of a polyimide layer formed of the material represented by Formula (102) shown above on the substrate side and a polyimide layer formed of the material represented by Formula (101) shown above, overlapping with each other.

Subsequently, the polyimide layer formed of the material represented by Formula (102) was imparted with a phase difference by irradiation with 2 J/cm² of polarized light with a central wavelength of 365 nm from the normal direction of the substrate to form a phase difference layer. The retardation of the phase difference layer was 3 nm.

Subsequently, 50 mJ/cm² of polarized light with a central wavelength of 315 nm was irradiated from the direction of 45° with respect to the normal direction of the substrate. On this occasion, the irradiation with polarized light was performed such that the polarization axis of the polarized light to be irradiated crossed the polarization axis of the polarized light irradiated on the phase difference layer at 45° in a planar view. Consequently, the polyimide layer formed of a material represented by Formula (101) shown above was imparted with a pretilt angle of about 87.0° to form a photo-alignment film.

Furthermore, a paint containing a mixture of the polyamic acid represented by Formula (101) shown above and the polyamic acid represented by the following Formula (103) was applied to one surface of another substrate (hereinafter, referred to as substrate B) to form a film.

[Chem. 53]

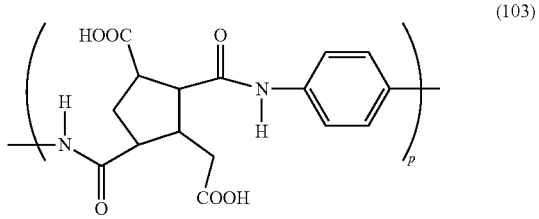

(103)

Subsequently, firing was performed to form a layered product of a polyimide layer formed of the material represented by Formula (103) shown above on the substrate side and a polyimide layer formed of the material represented by Formula (101) shown above, overlapping with each other.

Subsequently, 50 mJ/cm² of polarized light with a central wavelength of 315 nm was irradiated from the direction of 45° with respect to the normal direction of the substrate to impart a pretilt angle of about 87.0° to the polyimide layer formed of the material represented by Formula (101) to form a photo-alignment film.

Subsequently, a sealing agent was drawn on the substrate A on the photo-alignment film side, and a negative liquid crystal material was dropwise applied to the substrate B on the photo-alignment film side. Both the substrates were adhered to each other under vacuum, and the sealing agent was cured, followed by heating to 130° C. for reorientation to give a liquid crystal cell. On this occasion, it was designed so that the phase difference Δn·d of the liquid crystal layer was designed to be 330 nm.

Comparative Example 1

A liquid crystal cell was produced as in Example 1 except that the substrate A was also formed as in the substrate B using a paint containing a mixture of the polyamic acid represented by Formula (101) shown above and the polyamic acid represented by Formula (103) shown above to form a film as in substrate B. In the liquid crystal cell of Comparative Example 1, the pretilt angle of the photo-alignment film was 87.0°.

The resulting liquid crystal cells of Example 1 and Comparative Example 1 were evaluated by the above-described method. Table 2 shows the evaluation results.

TABLE 2

| | Response time (ms) | | VHR | rDC | Change amount in tilt angle |
| | Contrast | Rise | Decay | (%) | (mV) | (°) |
|---|---|---|---|---|---|---|
| Example 1 | 5000 | 4.1 | 3.8 | 99.3 | 100 | 0.02 |
| Comparative Example 1 | 4200 | 4.1 | 3.8 | 99.4 | 100 | 0.02 |

The results of evaluation revealed that the contrast of the liquid crystal cell of Example 1 was improved compared to the liquid crystal cell of Comparative Example 1, although there were no large differences in the response time, the VHR, the rDC, and the change amount in the tilt angle.

Evaluation 2

Example 2

A paint containing the polyamic acid represented by Formula (101) shown above but containing no polyamic acid represented by Formula (103) shown above was applied to one surface of a substrate A to form a film.

Subsequently, firing was performed to form a polyimide layer formed of the material represented by Formula (101).

Subsequently, 50 mJ/cm² of polarized light with a central wavelength of 315 nm was irradiated from the direction of 45° with respect to the normal direction of the substrate to impart a pretilt angle of about 87.0° to the polyimide layer formed of the material represented by Formula (101) to form a photo-alignment film.

Subsequently, a sealing agent was drawn on the substrate A on the photo-alignment film side, and a negative liquid crystal material was dropwise applied to the substrate B, produced as in Example 1, on the photo-alignment film side. On this occasion, the monomer represented by the following Formula (201) was dissolved in the negative liquid crystal material in an amount of 0.3 mass % based on the total amount of the liquid crystal material.

[Chem. 54]

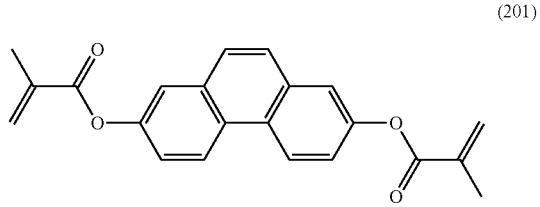

(201)

Both the substrates were adhered to each other under vacuum, and the sealing agent was cured, followed by heating to 130° C. for reorientation. Furthermore, irradiation with black light (wavelength: 320 nm) of unpolarized light was performed for 20 minutes (5 J/cm²) to form an alignment sustaining layer to give a liquid crystal cell. On this occasion, it was designed so that the phase difference Δn·d of the liquid crystal layer was designed to be 330 nm.

Comparative Example 2

A liquid crystal cell was produced as in Example 2 except that the monomer represented by Formula (201) shown above was not dissolved in the negative liquid crystal material.

The resulting liquid crystal cells of Example 2 and Comparative Example 2 were evaluated by the above-described method. Table 3 shows the evaluation results. In addition, the evaluation results of the liquid crystal cell of Example 1 are shown in Table 3 as reference.

TABLE 3

|  | Response time (ms) | | | VHR | rDC | Change amount in tilt angle |
| --- | --- | --- | --- | --- | --- | --- |
|  | Contrast | Rise | Decay | (%) | (mV) | (°) |
| Example 2 | 5000 | 4.1 | 3.8 | 98.8 | 130 | 0.03 |
| Comparative Example 2 | 5000 | 4.1 | 3.8 | 97.7 | 450 | 0.09 |
| (Reference) Example 1 | 5000 | 4.1 | 3.8 | 99.3 | 100 | 0.02 |

The results of evaluation demonstrated that in the liquid crystal cell of Comparative Example 2, since the layer configuration on the substrate A side was constituted of only the photo-alignment film, the resistance of the entire film between the substrate A and the liquid crystal layer was decreased, compared to the liquid crystal cell of Example 1 having a two-layer structure composed of the phase difference layer and the photo-alignment film. Consequently, in the liquid crystal cell of Comparative Example 2, the VHR was decreased and the rDC was increased compared to those in the liquid crystal cell of Example 1.

Furthermore, in the liquid crystal cell of Comparative Example 2, since the film on the substrate A side was constituted of only the polymer represented by Formula (101) shown above (photo-alignment film), all the polymer chains constituting the film on the substrate A side included a side chain. A polymer including a side chain has high flexibility of the molecule and therefore tends to change the tilt angle.

Unlike the above, the liquid crystal cell of Example 2, the polymer obtained by polymerization of the monomer represented by Formula (201) functioned as an alignment sustaining layer, and all the VHR, the rDC, and the change amount in the tilt angle were improved.

Evaluation 3

Example 3

A paint containing a mixture of the polyamic acid represented by Formula (102) shown above and the polysiloxane represented by Formula (105) shown above was applied to one surface of each of the substrates A and B to form the respective films.

[Chem. 55]

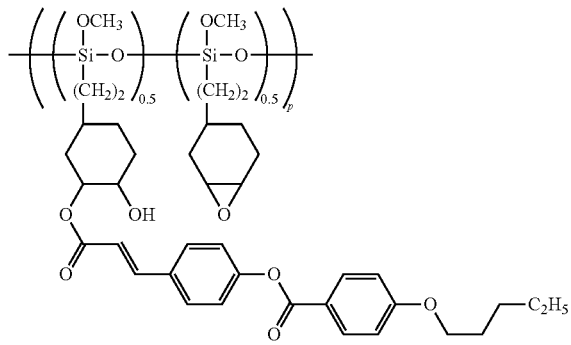

(105)

Subsequently, the polyamic acid layer formed of the material represented by Formula (102) shown above was imparted with a phase difference by irradiation with 5 J/cm² of polarized light with a central wavelength of 365 nm from the normal direction of the substrate to form a phase difference layer. The retardation of the phase difference layer was 7 nm.

Subsequently, firing was performed to form a layered product of a polyimide layer imparted with retardation and formed of the material represented by Formula (102) on the substrate side and a polysiloxane layer formed of the material represented by Formula (105), overlapping with each other.

Subsequently, 100 mJ/cm² of polarized light with a central wavelength of 315 nm was irradiated from the direction of 50° with respect to the normal direction of the substrate to impart a pretilt angle of about 86.0° to the polysiloxane layer formed of the material represented by Formula (105) shown above to form a photo-alignment film.

Subsequently, a sealing agent was drawn on the substrate A on the photo-alignment film side, and a negative liquid crystal material was dropwise applied to the substrate B on the photo-alignment film side. Both the substrates were adhered to each other under vacuum, and the sealing agent was cured, followed by heating to 130° C. for reorientation to give a liquid crystal cell. On this occasion, it was designed so that the phase difference Δn·d of the liquid crystal layer was designed to be 330 nm.

Comparative Example 3

A paint containing a mixture of the polyamic acid represented by Formula (103) shown above and the polysiloxane represented by Formula (105) shown above was applied to one surface of each of the substrates A and B to form the respective films, followed by firing to form a layered product of a polyimide layer provided with retardation and formed of the material represented by Formula (103) on the substrate side and a polysiloxane layer formed of the material represented by Formula (105), overlapping with each other.

Subsequently, the substrates A and B were each irradiated with 100 mJ/cm² of polarized light with a central wavelength of 315 nm from the direction of 50° with respect to the normal direction of the substrate to impart a pretilt angle of about 86.0° to the polysiloxane layer formed of the material represented by Formula (105) to form a photo-alignment film.

Subsequently, a sealing agent was drawn on the substrate A on the photo-alignment film side, and a negative liquid crystal material was dropwise applied to the substrate B on the photo-alignment film side. Both the substrates were adhered to each other under vacuum, and the sealing agent was cured, followed by heating to 130° C. for reorientation to give a liquid crystal cell. On this occasion, it was designed so that the phase difference Δn·d of the liquid crystal layer was designed to be 330 nm.

The resulting liquid crystal cells of Example 3 and Comparative Example 3 were evaluated by the above-described method. Table 4 shows the evaluation results.

TABLE 4

| | Response time (ms) | | VHR (%) | rDC (mV) | Change amount in tilt angle (°) |
|---|---|---|---|---|---|
| | Contrast | Rise | Decay | | | |
| Example 3 | 4900 | 3.9 | 4.5 | 99.2 | 50 | 0.02 |
| Comparative Example 3 | 3700 | 3.9 | 4.5 | 99.4 | 40 | 0.02 |

The results of evaluation revealed that the contrast of the liquid crystal cell of Example 3 was improved compared to the liquid crystal cell of Comparative Example 3, although there were no large differences in the response time, the VHR, the rDC, and the change amount in the tilt angle.

In addition, it was revealed that when the pretilt angle was set to 86.0°, although the rise response speed became faster, the decay response speed became slower, compared to Examples 1 and 2 in which the pretilt angle was 87.0°.

Evaluation 4

Example 4

A paint containing a mixture of the polyamic acid represented by the following Formula (106) and the polysiloxane represented by the following Formula (107) was applied to one surface of a substrate A to form a film.

[Chem. 56]

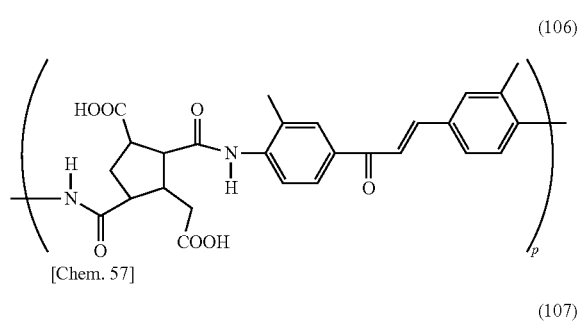

(106)

[Chem. 57]

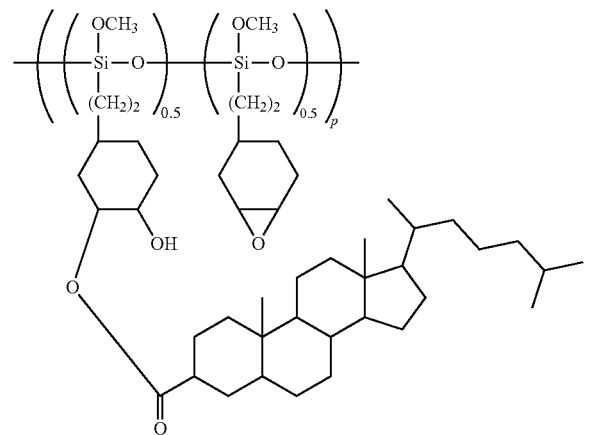

(107)

Subsequently, firing was performed to form a layered product of a polyimide layer formed of the material represented by Formula (106) shown above and a polysiloxane layer formed of the material represented by Formula (107) shown above, overlapping with each other.

Subsequently, the polyamic acid layer formed of the material represented by Formula (106) was imparted with a phase difference by irradiation with 5 J/cm² of polarized light with a central wavelength of 365 nm from the normal direction of the substrate to form a phase difference layer. The retardation of the phase difference layer was 15 nm.

Subsequently, 100 mJ/cm² of polarized light with a central wavelength of 315 nm was irradiated from the direction of 50° with respect to the normal direction of the substrate to impart a pretilt angle of about 80.0° to the polysiloxane layer formed of the material represented by Formula (107) shown above to form a photo-alignment film.

Separately, a paint containing a mixture of the polyamic acid represented by Formula (103) shown above and the polysiloxane represented by the following Formula (108) was applied to one surface of the substrate B to form a film.

[Chem. 58]

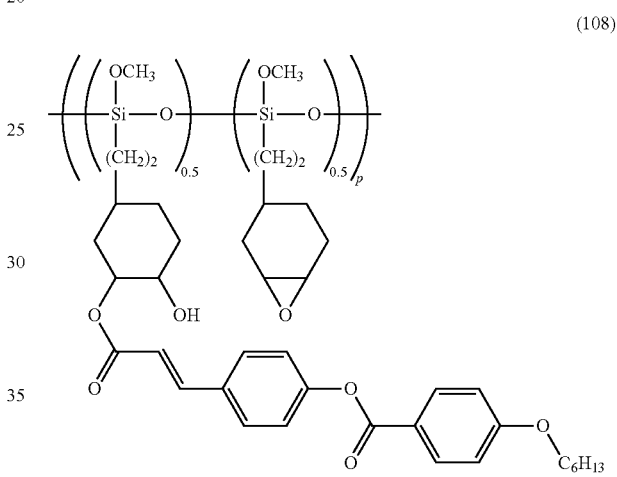

(108)

Subsequently, firing was performed to form a layered product of a polyimide layer formed of the material represented by Formula (103) and a polysiloxane layer formed of the material represented by Formula (108), overlapping with each other.

Subsequently, 100 mJ/cm² of polarized light with a central wavelength of 315 nm was irradiated from the direction of 50° with respect to the normal direction of the substrate to impart a pretilt angle of about 80.0° to the polysiloxane layer formed of the material represented by Formula (107) to form a photo-alignment film.

Subsequently, a sealing agent was drawn on the substrate A on the photo-alignment film side, and a negative liquid crystal material was dropwise applied to the substrate B on the photo-alignment film side. Both the substrates were adhered to each other under vacuum, and the sealing agent was cured, followed by heating to 130° C. for reorientation to give a liquid crystal cell. On this occasion, it was designed so that the phase difference Δn·d of the liquid crystal layer was designed to be 330 nm.

Comparative Example 4

A paint containing a mixture of the polyamic acid represented by Formula (103) shown above and the polysiloxane represented by Formula (107) shown above was applied to one surface of a substrate A to form each film, followed by firing to form a layered product of a polyimide layer formed of the material represented by Formula (103) on the substrate side and a vertical alignment film formed of the material represented by Formula (107), overlapping with each other.

Subsequently, a sealing agent was drawn on the substrate A on the photo-alignment film side, and a negative liquid crystal material was dropwise applied to the substrate B on the photo-alignment film side formed as in Example 4. Both the substrates were adhered to each other under vacuum, and the sealing agent was cured, followed by heating to 130° C. for reorientation to give a liquid crystal cell. On this occasion, it was designed so that the phase difference Δn·d of the liquid crystal layer was designed to be 330 nm.

The resulting liquid crystal cells of Example 4 and Comparative Example 4 were evaluated by the above-described method. Table 5 shows the evaluation results.

TABLE 5

|  | Contrast | Response time (ms) | | VHR (%) | rDC (mV) | Change amount in tilt angle (°) |
| --- | --- | --- | --- | --- | --- | --- |
|  |  | Rise | Decay |  |  |  |
| Example 4 | 4700 | 3.7 | 5.3 | 99.4 | 30 | 0.02 |
| Comparative Example 4 | 2000 | 3.7 | 5.3 | 99.4 | 30 | 0.02 |

The results of evaluation revealed that the contrast of the liquid crystal cell of Example 4 was improved compared to the liquid crystal cell of Comparative Example 4, although there were no large differences in the response time, the VHR, the rDC, and the change amount in the tilt angle.

In addition, it was revealed that when the pretilt angles 80.0° and 90.0° were combined, although the rise response speed became faster, the decay response speed became slower, compared to Examples 1 and 2 in which the pretilt angle was 87.0° and Example 3 in which the pretilt angle was 86.0°.

Evaluation 5

Example 5

A paint containing the polysiloxane represented by Formula (107) shown above but containing no polyamic acid represented by Formula (106) shown above was applied to one surface of a substrate A to form a film.

Subsequently, firing was performed to form a polysiloxane layer formed of the material represented by Formula (107).

Subsequently, 100 mJ/cm² of polarized light with a central wavelength of 315 nm was irradiated from the direction of 50° with respect to the normal direction of the substrate to impart a pretilt angle of about 80.0° to the polysiloxane layer formed of the material represented by Formula (107) to form a photo-alignment film.

Subsequently, a sealing agent was drawn on the substrate A on the photo-alignment film side, and a negative liquid crystal material was dropwise applied to the substrate B, produced as in Example 4, on the photo-alignment film side. On this occasion, the monomer represented by the following Formula (202) was dissolved in the negative liquid crystal material in an amount of 0.3 mass % based on the total amount of the liquid crystal material.

[Chem. 59]

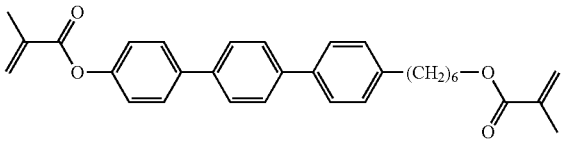

(202)

Both the substrates were adhered to each other under vacuum, and the sealing agent was cured, followed by heating to 130° C. for reorientation. Furthermore, irradiation with black light (wavelength: 320 nm) of unpolarized light was performed for 20 minutes (5 J/cm²) to form an alignment sustaining layer to give a liquid crystal cell. On this occasion, it was designed so that the phase difference Δn·d of the liquid crystal layer was designed to be 330 nm.

Comparative Example 5

A liquid crystal cell was produced as in Example 4 except that the monomer represented by Formula (202) shown above was not dissolved in the negative liquid crystal material.

The resulting liquid crystal cells of Example 5 and Comparative Example 5 were evaluated by the above-described method. Table 6 shows the evaluation results.

TABLE 6

|  | Contrast | Response time (ms) | | VHR (%) | rDC (mV) | Change amount in tilt angle (°) |
| --- | --- | --- | --- | --- | --- | --- |
|  |  | Rise | Decay |  |  |  |
| Example 5 | 4700 | 3.7 | 5.3 | 98.9 | 20 | 0.04 |
| Comparative Example 5 | 4700 | 3.7 | 5.3 | 98.1 | 160 | 0.11 |
| (Reference) Example 4 | 4700 | 3.7 | 5.3 | 99.4 | 30 | 0.02 |

The results of evaluation demonstrated that in the liquid crystal cell of Comparative Example 5, since the layer configuration on the substrate A side was constituted of only the photo-alignment film, the resistance of the entire film between the substrate A and the liquid crystal layer was decreased, compared to the liquid crystal cell of Example 4 having a two-layer structure composed of the underlayer and the photo-alignment film. Consequently, in the liquid crystal cell of Comparative Example 5, the VHR was decreased and the rDC was increased compared to those in the liquid crystal cell of Example 4.

Furthermore, in the liquid crystal cell of Comparative Example 5, since the film on the substrate A side was constituted of only the polymer represented by Formula (107) shown above (photo-alignment film), all the polymer chains constituting the film on the substrate A side included side chains. A polymer including a side chain has high flexibility of the molecule and therefore tends to change the tilt angle.

Unlike the above, the liquid crystal cell of Example 5, the polymer obtained by polymerization of the monomer represented by Formula (202) functioned as an alignment sustaining layer, and all the VHR, the rDC, and the change amount in the tilt angle were improved.

Evaluation 6

Example 6

A photo-alignment film was formed on one surface of a substrate A as in Example 5.

Separately, a polysiloxane layer formed of the material represented by Formula (107) shown above was formed on one surface of a substrate B, followed by firing to form a vertical alignment film.

Subsequently, a sealing agent was drawn on the substrate A on the photo-alignment film side, and a negative liquid crystal material was dropwise applied to the substrate B on the photo-alignment film side. Both the substrates were adhered to each other under vacuum, and the sealing agent was cured, followed by heating to 130° C. for reorientation to give a liquid crystal cell of a vertical ECB mode. On this occasion, it was designed so that the phase difference $\Delta n \cdot d$ of the liquid crystal layer was designed to be 330 nm.

The resulting liquid crystal cell of Example 6 was evaluated by the above-described method. Table 7 shows the evaluation results.

TABLE 7

| | Response time (ms) | | VHR | rDC | Change amount in tilt angle |
|---|---|---|---|---|---|
| | Contrast | Rise | Decay | (%) | (mV) | (°) |
| Example 6 | 4600 | 3.7 | 5.3 | 98.3 | 10 | 0.03 |
| Comparative Example 4 | 2000 | 3.7 | 5.3 | 99.4 | 30 | 0.02 |

The results of evaluation revealed that the contrast of the liquid crystal cell of Example 6 was improved compared to the liquid crystal cell of Comparative Example 4 having the same pretilt angle configuration as that of the liquid crystal cell of Example 6 but not having a phase difference layer, although there were no large differences in the response time, the VHR, the rDC, and the change amount in the tilt angle.

The results described above verified that an aspect of the present invention is useful.

INDUSTRIAL APPLICABILITY

An aspect of the present invention can be applied to, for example, a liquid crystal panel having a novel configuration, a method for manufacturing a liquid crystal panel that can easily manufacture such a liquid crystal panel, and a display device using them.

REFERENCE SIGNS LIST 10 element substrate
11 TFT substrate (first substrate)
12 first phase difference layer
13 first alignment film
16, 26 alignment sustaining layer
20 opposite substrate
21 color filter substrate (second substrate)
22 second phase difference layer
23 second alignment film
30 liquid crystal layer
100, 150 liquid crystal display device

The invention claimed is:

1. A liquid crystal display device comprising:
a first substrate;
a second substrate facing the first substrate;
a liquid crystal layer sandwiched between the first substrate and the second substrate and containing a negative liquid crystal material;
a first alignment film provided on a surface of the first substrate on a liquid crystal layer side;
a first phase difference layer having birefringence provided between the first substrate and the first alignment film; and
a second alignment film provided on a surface of the second substrate on the liquid crystal layer side, wherein
at least one of the first alignment film and the second alignment film is a photo-alignment film being in contact with the liquid crystal layer and imparting a pretilt angle of 75° or more and less than 90° to the liquid crystal material;
the first phase difference layer is formed of a first polymer material having a first photofunctional group;
the photo-alignment film is formed of a second polymer material having a second photofunctional group;
the first photofunctional group and the second photofunctional group are each a group causing at least one photoreaction selected from the group consisting of isomerization reaction, dimerization reaction, Fries rearrangement reaction, and cleavage reaction;
the first phase difference layer is formed of at least one of a polyamic acid represented by the following Formula (102) and a polyamic acid represented by the following Formula (106); and
the first alignment film is formed of at least one of a polyamic acid represented by the following Formula (101), a polysiloxane represented by the following Formula (105), and a polysiloxane represented by the following Formula (107);

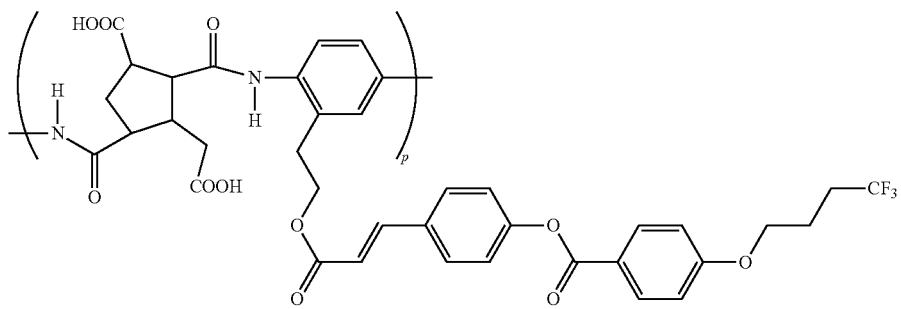

(101)

-continued

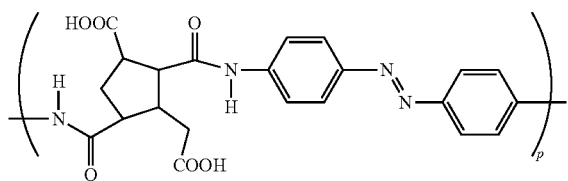
(102)

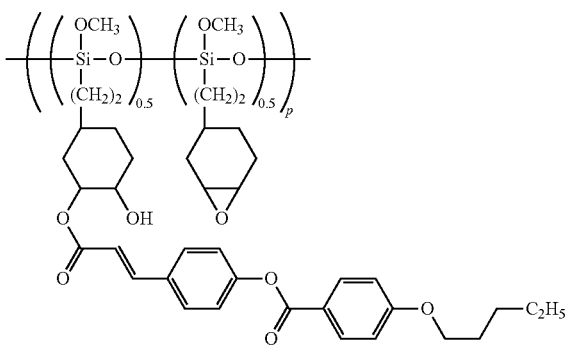
(105)

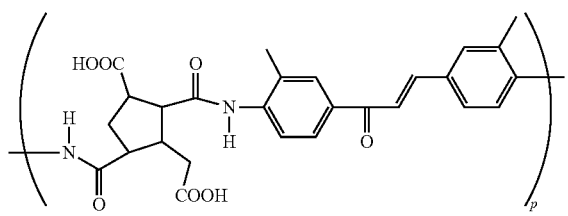
(106)

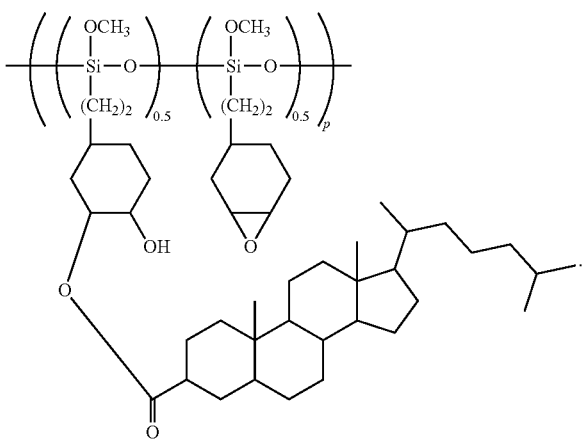
(107)

2. The liquid crystal display device according to claim 1, wherein
one of the first alignment film and the second alignment film is the photo-alignment film; and
the other of the first alignment film and the second alignment film is a vertical alignment film.

3. The liquid crystal display device according to claim 1, wherein
the first alignment film and the second alignment film are photo-alignment films; and
an alignment direction of the liquid crystal material by the first alignment film and an alignment direction of the liquid crystal material by the second alignment film are set to be in the same direction in a field of view from a normal direction of the first substrate.

4. The liquid crystal display device according to claim 1, further comprising:
a second phase difference layer having birefringence provided between the second substrate and the second alignment film, wherein
the second phase difference layer is formed of the first polymer material.

5. The liquid crystal display device according to claim 1, wherein the pretilt angle is 80.0° or more and 88.5° or less.

6. The liquid crystal display device according to claim 1, wherein the first photofunctional group is at least one group selected from the group consisting of a cinnamate group, an azobenzene group, a chalcone group, a tolane group, and a cyclobutane group.

7. The liquid crystal display device according to claim 1, wherein the second photofunctional group is at least one group selected from the group consisting of a coumarin group, a cinnamate group, and a stilbene group.

8. The liquid crystal display device according to claim 1, further comprising an alignment sustaining layer that is in contact with a surface of the first alignment film and another alignment sustaining layer that is in contact with a surface of the second alignment film.

9. The liquid crystal display device according to claim 1, wherein
in adjacent four pixels, a liquid crystal alignment direction of a first pixel, a liquid crystal alignment direction of a second pixel, a liquid crystal alignment direction of a third pixel, and a liquid crystal alignment direction of a fourth pixel are different from each other; and
the liquid crystal alignment direction of an arbitrary pixel of the adjacent four pixels and the liquid crystal alignment directions of the remaining three pixels are different by integral multiples of 90°.

10. The liquid crystal display device according to claim 1, wherein the first alignment film and the second alignment film are both the photo-alignment films.

11. The liquid crystal display device according to claim 10, further comprising an underlayer provided between the second substrate and the second alignment film.

12. The liquid crystal display device according to claim 1, wherein
the first alignment film is a vertical alignment film; and
the second alignment film is the photo-alignment film.

13. The liquid crystal display device according to claim 10, further comprising a second phase difference layer having birefringence provided between the second substrate and the second alignment film.

14. The liquid crystal display device according to claim 1, wherein
a retardation value of the first phase difference layer is 0.1 nm or more and 10 nm or less.

* * * * *